(12) United States Patent
Ishimoto et al.

(10) Patent No.: US 8,446,802 B2
(45) Date of Patent: May 21, 2013

(54) OPTICAL DRIVE DEVICE AND FOCUS SERVO CONTROL METHOD

(75) Inventors: Tsutomu Ishimoto, Tokyo (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 204 days.

(21) Appl. No.: 12/984,755

(22) Filed: Jan. 5, 2011

(65) Prior Publication Data
US 2011/0170388 A1 Jul. 14, 2011

(30) Foreign Application Priority Data

Jan. 14, 2010 (JP) ................ P2010-005735

(51) Int. Cl.
*G11B 7/00* (2006.01)
*G11B 5/58* (2006.01)
*G11B 20/18* (2006.01)
*G11B 27/36* (2006.01)
*G11B 5/09* (2006.01)
*G11B 21/10* (2006.01)

(52) U.S. Cl.
USPC .............. 369/44.37; 369/53.23; 369/53.28; 369/53.35; 369/47.45; 369/43; 369/44.11; 369/44.14; 369/44.25; 369/44.26

(58) Field of Classification Search
USPC .......... 369/44.37, 53.23, 53.28, 53.35, 47.45, 369/43, 44.11, 44.14, 44.25, 44.26
See application file for complete search history.

(56) References Cited

U.S. PATENT DOCUMENTS

| | | | |
|---|---|---|---|
| 2008/0186840 A1 | 8/2008 | Uchiyama et al. | |
| 2008/0205257 A1 | 8/2008 | Yamatsu et al. | |
| 2009/0003183 A1 | 1/2009 | Miyamoto et al. | |
| 2011/0134730 A1* | 6/2011 | Ishimoto | 369/44.13 |

FOREIGN PATENT DOCUMENTS

| | | |
|---|---|---|
| JP | 2008-135144 | 6/2008 |
| JP | 2008-176902 | 7/2008 |
| JP | 2009-09635 | 1/2009 |

* cited by examiner

*Primary Examiner* — Aneeta Yodichkas
(74) *Attorney, Agent, or Firm* — K&L Gates LLP

(57) ABSTRACT

An optical drive device includes first and second light sources, an objective lens configured to receive a first light emitted from the first light source and a second light emitted from the second light source and to irradiate both the first light and the second light to an optical disc recording medium, a first focus mechanism configured to drive the objective lens in a focus direction, a second focus mechanism configured to change collimation of the second light incident to the objective lens and changing the focusing position of the second light independently of the first light, a first focus servo control unit configured to drive the first focus mechanism, an error signal subtraction unit configured to subtract the first focus error signal from a second focus error signal, and a second focus servo control unit configured to drive the second focus mechanism.

7 Claims, 23 Drawing Sheets

PRIOR ART

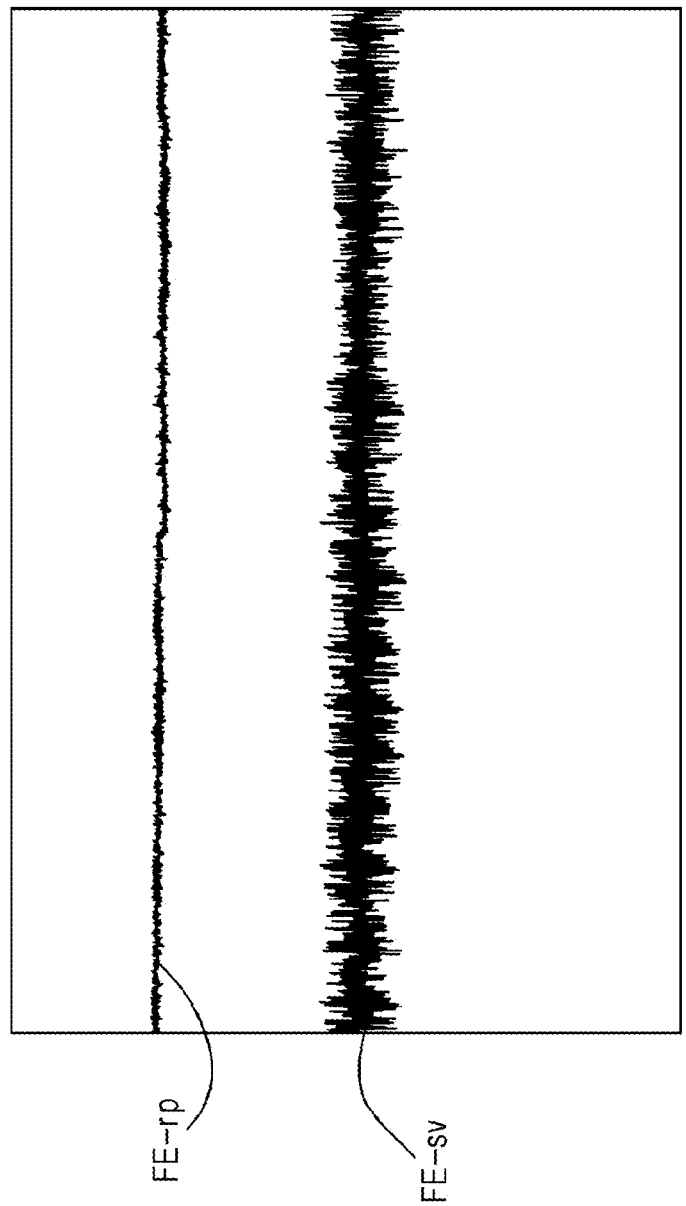

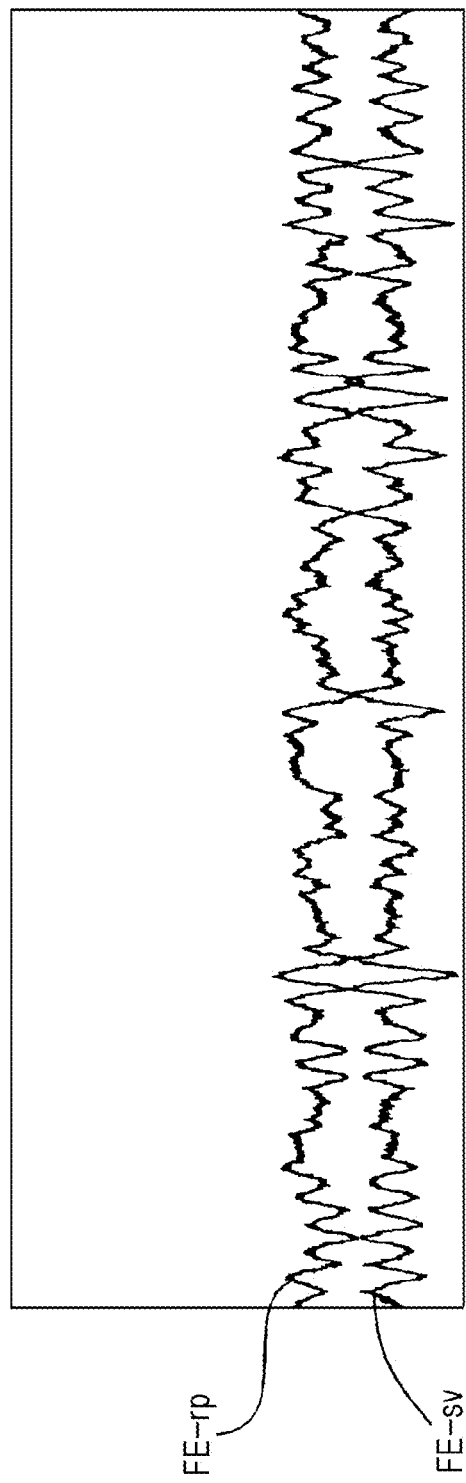

OPTICAL DRIVE DEVICE AND FOCUS SERVO CONTROL METHOD

CROSS REFERENCES TO RELATED APPLICATIONS

The present application claims priority to Japanese Priority Patent Application JP 2010-005735 filed in the Japan Patent Office on Jan. 14, 2010, the entire contents of which are hereby incorporated by reference.

BACKGROUND

The present application relates to an optical drive device for performing recording and/or reproduction with respect to an optical disc recording medium and a focus servo control method thereof and, more particularly, to an optical drive device configured to irradiate a recording/reproducing light for recording (or reproducing) a mark and a servo light for performing servo control based on a position guide element formed in the optical disc recording medium through a common objective lens.

As an optical recording medium for performing recording/reproduction of a signal by light irradiation, for example, a so-called optical disc such as a Compact Disc (CD), Digital Versatile Disc (DVD) or Blu-ray Disc (BD) (registered trademark) have come into wide use.

With respect to an optical recording medium which is a next-generation optical recording medium widely used in the present state of the CD, the DVD, the BD and the like, first, the present applicant proposes a so-called bulk recording type optical recording medium described in Japanese Unexamined Patent Application Publication No. 2008-135144 or 2008-176902.

Japanese Unexamined Patent Application Publication No. 2009-9635 is also an example of related art.

Here, bulk recording indicates, for example, a technology of realizing a large amount of recording capacity by irradiating a laser beam to an optical recording medium (bulk type recording medium 100) having at least a cover layer 101 and a bulk layer (recording layer) 102 by sequentially changing a focal point position so as to perform multi-layer recording in the bulk layer 102, as shown in FIG. 15.

In such bulk recording, Japanese Unexamined Patent Application Publication No. 2008-135144 discloses recording technology which is called a so-called micro hologram method.

The micro hologram method is classified broadly into a positive type micro hologram method and a negative type micro hologram method, as shown in FIGS. 16A and 16B.

In the micro hologram method, a so-called hologram recording material is used as a recording material of the bulk layer 102. As the hologram recording material, for example, a photopolymerizable photopolymer is widely used.

As shown in FIG. 16A, the positive type micro hologram method is a method of focusing two opposing light fluxes (light flux A and light flux B) at the same position so as to form a minute interference fringe (hologram) and using the minute interference fringe as a recording mark.

The negative type micro hologram method shown in FIG. 16B is a method of erasing an interference fringe formed in advance by laser beam irradiation and using the erased portion as a recording mark, in opposition to the positive type micro hologram method.

FIGS. 17A and 17B are diagrams illustrating the negative type micro hologram method.

In the negative type micro hologram method, before performing a recording operation, as shown in FIG. 17A, an initialization process for forming an interference fringe in the bulk layer 102 is performed in advance. In detail, as shown in the drawing, light fluxes C and D by parallel lights are oppositely irradiated so as to form such an interference fringe in the overall bulk layer 102.

After the interference fringe is formed in advance by the initialization process, as shown in FIG. 17B, information recording is performed by forming an erasing mark. In detail, by irradiating a laser beam according to recording information in a state of focusing on an arbitrary layer position, information recording by the erasing mark is performed.

The present applicant proposes, for example, a recording method of forming a void (hole) disclosed in Japanese Unexamined Patent Application Publication No. 2008-176902 as a recording mark, as a bulk recording method different from the micro hologram method.

The void recording method is, for example, a method of irradiating a laser beam to the bulk layer 102 formed of a recording material such as a photopolymerizable photopolymer with relatively high power so as to record a hole (void) in the bulk layer 102. As described in Japanese Unexamined Patent Application Publication No. 2008-176902, the formed hole portion has a refractive index different from that of the other portion of the bulk layer 102 and thus the light reflection ratio of the boundary portion thereof is increased. Accordingly, the hole portion functions as a recording mark and thus information recording by formation of a hole mark is realized.

In such a void recording method, since the hologram is not formed, recording is completed by light irradiation from one side. That is, as in the positive type micro hologram method, it is not necessary to focus two light fluxes at the same position so as to form the recording mark.

In addition, in comparison with the negative type micro hologram method, it is an advantage that the initialization process is not performed.

In Japanese Unexamined Patent Application Publication No. 2008-176902, although an example of irradiating a pre-cure light before recording at the time of performing void recording is described, void recording is possible even when the irradiation of the pre-cure light is omitted.

However, even in the bulk recording type (simply also referred to as bulk type) optical disc recording medium in which the above various recording methods are proposed, the recording layer (bulk layer) of the bulk type optical disc recording medium does not have an explicit multi-layer structure in the sense that, for example, a plurality of reflection films is formed. That is, in the bulk layer 102, a reflection film and a guide groove for every recording layer including a general multi-layer disc are not provided.

Accordingly, in the structure of the bulk type recording medium 100 as it is shown in FIG. 15, focus servo and tracking servo may not be performed during recording in which the mark is not formed.

Accordingly, practically, in the bulk type recording medium 100, a reflection surface (reference surface) is provided which becomes a reference having guide grooves shown in FIG. 18.

In detail, the guide grooves (position guide element) such as pits or grooves are formed in a lower surface side of the cover layer 101 and a selective reflection film 103 is formed on the guide grooves. The bulk layer 102 is laminated on the lower layer side of the cover layer 101, on which the selective reflection film 103 is formed, with an adhesive material interposed therebetween as an intermediate layer 104 in the drawing, such as a UV curing resin.

Here, by the formation of the guide grooves such as the pits or the grooves, for example, recording of absolute position information such as radius position information or rotation angle information is performed. In the following description, a surface (in this case, a surface on which the selective reflection film 103 is formed) in which such guide grooves are formed and the absolute position information is recorded is referred to as a "reference surface Ref".

After such a medium structure is formed, as shown in FIG. 19, separately from a laser beam (hereinafter, referred to as a recording/reproducing laser beam or simply a recording/reproducing light) for recording (or reproducing) a mark, a servo laser beam (simply referred to as a servo light) as a laser beam for position control is irradiated to the bulk type recording medium 100.

As shown, the recording/reproducing laser beam and the servo laser beam are irradiated to the bulk type recording medium 100 through a common objective lens.

At this time, if the servo laser beam reaches the bulk layer 102, the mark recording in the bulk layer 102 may be adversely affected. Accordingly, in the bulk recording method of the related art, the laser beam having a wavelength range different from that of the recording/reproducing laser beam is used as the servo laser beam, and the selective reflection film 103 having wavelength selectivity, which reflects the servo laser beam and transmits the recording/reproducing laser beam is provided as the reflection film formed on the reference surface Ref.

On the above assumption, the operation at the time of mark recording for the bulk type recording medium 100 will be described with reference to FIG. 19.

First, when multi-layer recording is performed with respect to the bulk layer 102 in which the guide grooves and the reflection film are not formed, the layer position for recording the mark in a depth direction in the bulk layer 102 is set in advance. In the drawing, the case where a total of 5 information recording layers (mark forming layers) L including a first information recording layer L1 to a fifth information recording layer L5 is set as a layer position (mark forming layer; also referred to as an information recording layer) for forming the mark in the bulk layer 102 is shown. As shown, the layer position of the first information recording layer L1 is set to a position separated by a first offset of-L1 in a focus direction (depth direction) from the selective reflection film 103 (reference surface) in which the guide grooves are formed. The layer position of the second information recording layer L2, the layer position of the third information recording layer L3, the layer position of the fourth information recording layer L4 and the layer position of the fifth information recording layer L5 are set to positions separated from the selective reflection film 103 by a second offset of-L2, a third offset of-L3, a fourth offset of-L4 and a fifth offset of-L5, respectively.

During recording in which the mark is not yet formed, focus servo and tracking servo are not performed based on the reflected light of the recording/reproducing laser beam with respect to the layer positions in the bulk layer 102 as a target. Accordingly, the focus servo control and the tracking servo control of the objective lens during recording are performed so as to enable the spot position of the servo laser beam to follow the guide grooves on the reference surface Ref (selective reflection film 103) based on the reflected light of the servo laser beam.

It is necessary for the recording/reproducing laser beam to reach the bulk layer 102 formed on the lower layer side of the selective reflection film 103, for mark recording. To this end, in an optical system of this case, a focus mechanism for the recording/reproducing light is provided, which independently adjusts a focusing position of the recording/reproducing laser beam separately from the focus mechanism of the objective lens.

Here, a configuration example of an optical system for performing recording and reproduction of the bulk type recording medium 100 including the mechanism for independently adjusting the focusing position of the recording/reproducing laser beam is shown in FIG. 20.

In FIG. 20, as shown, the objective lens shown in FIG. 19 may be displaced by the biaxial actuator in a radius direction (tracking direction) of the bulk type recording medium 100 and a direction (focus direction) abutting on or separated from the bulk type recording medium 100.

In FIG. 20, the mechanism for independently adjusting the focusing position of the recording/reproducing laser beam corresponds to a focus mechanism expander shown in the drawing. In detail, the focus mechanism as the expander includes a fixed lens and a movable lens which is held so as displaceably in a direction parallel to an optical axis of the recording/reproducing laser beam by a lens driving unit. By driving the movable lens by the lens driving unit, the collimation of the recording/reproducing laser beam incident to the objective lens in the drawing is changed and thus the focusing position of the recording/reproducing laser beam is adjusted independently of the servo laser beam.

As described above, since the recording/reproducing laser beam and the servo laser beam have different wavelength ranges, in correspondence therewith, in the optical system of this case, the reflected lights from the bulk type recording medium 100 of the recording/reproducing laser beam and the servo laser beam are separated to the respective systems (that is, the respective reflected lights are independently detected) by a dichroic prism as in the drawing.

In a forward light, the dichroic prism has a function for synthesizing the recording/reproducing laser beam and the servo laser beam on the same optical axis so as to enable the synthesized beam to enter the objective lens. In detail, in this case, as shown, the recording/reproducing laser beam is reflected from a mirror through the expander and then is reflected from a selective reflection surface of the dichroic prism so as to enter the objective lens. In contrast, the servo laser beam transmits the selective reflection surfaces of the dichroic prism so as to enter the objective lens.

FIG. 21 is a diagram illustrating servo control at the time of the reproduction of the bulk type recording medium 100.

During reproduction of the bulk type recording medium 100 in which the mark recording is already performed, it is not necessary to control the position of the objective lens based on the reflected light of the servo laser beam as during recording. That is, during reproduction, focus servo control and tracking servo control of the objective lens may be performed to the mark string formed in the information recording layer L to be reproduced as a target based on the reflected light of the recording/reproducing laser beam.

As described above, in the bulk recording method, the recording/reproducing laser beam for recording/reproducing a mark and the servo light as the position control beam are irradiated to the bulk type recording medium 100 through the common objective lens (synthesized on the same optical axis), the focus servo control and the tracking servo control of the objective lens are performed during recording such that the servo laser beam follows the guide grooves of the reference surface Ref, and the focal point position of the recording/reproducing laser beam is separately adjusted by the focus mechanism for the recording/reproducing light such that the mark is recorded at the necessary position (in the depth direction and the tracking direction) in the bulk layer 102 even when the guide grooves are not formed in the bulk layer 102.

In addition, during reproduction, by performing the focus servo control and the tracking servo control of the objective lens based on the reflected light of the recording/reproducing laser beam such that the focal point position of the recording/reproducing laser beam follows the mark string recorded in advance, it is possible to reproduce the mark recorded in the bulk layer 102.

When considering only the reproduction of the mark, in the servo control during reproduction, it is necessary to perform only servo control based on the recording/reproducing laser beam as described above. However, in practice, during the reproduction of the mark, the servo control for the reference surface Ref of the servo laser beam may be requested, for the reason that the reading of the absolute position information recorded on the reference surface Ref is performed.

At this time, in the case where the mark string formed in a certain information recording layer L is reproduced, if the focus servo control of the objective lens based on the reflected light of the recording/reproducing laser beam in a state in which the focus mechanism of the recording/reproducing laser beam shown in FIG. 20 is driven by the same amount as during recording, the focal point position of the servo laser beam ideally matches on the reference surface Ref (the driving state in the focus direction of the objective lens is ideally the same as during recording).

However, in practice, during recording, even the servo of the servo laser beam for the reference surface Ref as a target is performed as described above, the focusing position (that is, the mark recording position) of the recording/reproducing laser beam may not be maintained on the information recording layer L selected to be recorded. In other words, in practice, it is difficult to maintain the gap between the reference surface Ref and the mark recording position in the depth direction by the offset of-L corresponding to the information recording layer L as a target.

In detail, FIG. 22 illustrates the relationship between the reference surface Ref and the recorded mark string in practice.

That is, as shown in FIG. 22, the recorded mark string is not parallel to the reference surface Ref.

As described above, during reproduction, when only the servo control of the objective lens based on the recording/reproducing laser beam is performed, the focal point position of the servo laser beam may not match to the reference surface Ref.

In addition, the phenomenon shown in FIG. 22 occurs because the adjustment of the focusing position of the recording/reproducing laser beam during recording is performed by changing the collimation of the recording/reproducing laser beam incident to the expander shown in FIG. 20, that is, the objective lens.

The expander may adjust the focusing position of the recording/reproducing laser beam at a position different from the focusing position of the servo laser beam incident to the objective lens as a parallel light by enabling the recording/reproducing laser beam to enter the objective lens as a non-parallel light. However, by enabling the recording/reproducing laser beam to enter the objective lens as the non-parallel light, if the objective lens is driven in the focus direction by follow-up to surface wobbling or the like of the bulk type recording medium 100, the incident diameter of the recording/reproducing laser beam to the objective lens is changed and, as a result, the focusing position of the recording/reproducing laser beam is changed from the original position.

Accordingly, the gap between the recorded mark string (the focusing position of the recording/reproducing laser beam) and the reference surface Ref (the focusing position of the servo laser beam) is not uniform and the non-parallel relationship shown in FIG. 22 occurs.

In order to solve such a problem, in the related art, as shown in FIG. 23, a configuration is proposed in which a focus mechanism is separately provided on the servo laser beam side.

In FIG. 23, a recording/reproducing laser 111, a collimation lens 112, a beam splitter 113, a focus mechanism 114 for a recording/reproducing light, a lens driving unit 115, a mirror 116, a focusing lens 120 and a photodetector 121 in the drawing configure an optical system of a recording/reproducing laser beam. In addition, a servo laser 122, a collimation lens 123, a beam splitter 124, a focus mechanism 125 for a servo light, a lens driving unit 126, a focusing lens 127 and a photodetector 128 in the drawing configure an optical system of a servo laser beam.

In addition, a dichroic prism 117, an objective lens 118 and a biaxial actuator 119 configure a common optical system of the recording/reproducing laser beam and the servo laser beam, as can be understood from the description with reference to FIG. 20.

As shown, in the optical system in this case, the focus mechanism 125 for the servo light for changing the collimation of the servo laser beam incident to the objective lens 118 and independently adjusting the focusing position of the servo laser beam is added.

In this case, during reproduction, while a recording/reproducing light servo circuit 129 performs focus servo control of the objective lens 118 (the biaxial actuator 119) based on information about the reflected light of the recording/reproducing laser beam obtained by the photodetector 121, a servo circuit 130 for a servo light drives the lens driving unit 126 of the focus mechanism 125 for the servo light based on information about the reflected light of the servo laser beam obtained by the photodetector 128 in the drawing, thus the focus servo control is performed such that the servo laser beam is focused on the reference surface Ref.

Accordingly, it is possible to perform control such that the focusing position of the servo laser beam during reproduction follows the reference surface Ref.

In addition, in FIG. 23, for confirmation, the content of the control performed to the focus mechanisms of the focus mechanism 114 for the recording/reproducing light, the biaxial actuator 119 and the focus mechanism 125 for the servo light is shown. As shown, with respect to the biaxial actuator 119, during recording, the focus servo control and the tracking servo control based on the reflected light of the servo laser beam by the servo circuit 130 for the servo light are performed. In addition, during reproduction, the focus servo control and the tracking servo control based on the reflected light of the recording/reproducing laser beam by the recording/reproducing light servo circuit 129 are performed.

With respect to the focus mechanism 125 for the servo light, only during reproduction, the focus servo control based on the reflected light of the servo laser beam by the servo circuit 130 for the servo light is performed.

In addition, the focus mechanism 114 for the recording/reproducing light is driven according to the value of the offset corresponding to the information recording layer L as a target.

SUMMARY

However, if the above-described focus servo control during reproduction is performed, since a focus error signal of the servo laser beam is observed through the objective lens 118 (the biaxial actuator 119), it is largely influenced by focus servo performance of the recording/reproducing laser beam side. In other words, according to the above-described focus servo control during reproduction, the amount corresponding to the error (residual error) of the focus servo system side of the recording/reproducing laser beam is applied to a focus servo system of the servo laser beam as disturbance and, as a result, the performance of the focus servo system of the servo laser beam side deteriorates.

With respect to such a problem, by increasing the band of the focus servo system of the recording/reproducing laser beam side, the residual error is reduced and thus the performance deterioration of the focus servo system of the servo laser beam side is suppressed.

However, the band of the focus servo system may not be sufficiently increased by the influence of the resonance of the biaxial actuator 119 or the like.

In addition, even when the band of the focus servo system is increased, in practice, since it is difficult to infinitely increase DC gain, the residual error may not become zero.

As can be understood from such a point, in the method of increasing the band of the focus servo system, the disturbance of the focus servo system of the servo laser beam side may not essentially become zero and, as a result, leakage from the focus servo system of the recording/reproducing laser beam side may not be fundamentally prevented.

In the present application, an optical drive device has the following configuration.

That is, a first light source and a second light source are included.

In addition, an objective lens configured to receive a first light emitted from the first light source and a second light emitted from the second light source and to irradiate both the first light and the second light to an optical disc recording medium is included.

In addition, a first focus mechanism configured to drive the objective lens in a focus direction is included.

In addition, a second focus mechanism configured to change collimation of the second light incident to the objective lens and changing the focusing position of the second light independently of the first light is included.

In addition, a first focus servo control unit configured to drive the first focus mechanism based on a first focus error signal obtained by receiving the reflected light of the first light so as to perform focus servo control of the first light is included.

In addition, an error signal subtraction unit configured to subtract the first focus error signal from a second focus error signal obtained by receiving the reflected light of the second light is included.

In addition, a second focus servo control unit configured to drive the second focus mechanism based on the second focus error signal subjected to the subtraction by the error signal subtraction unit so as to perform focus servo control of the second light is included.

As described above, in the present application, in the case where both the first light and the second light are irradiated to the optical disc recording medium through the common objective lens and, while the first focus mechanism which is the focus mechanism of the objective lens is driven so as to perform the focus servo control (first focus servo control) of the first light, the second focus mechanism for changing the collimation of the second light incident to the objective lens is driven so as to perform the focus servo control (second focus servo control) of the second light, the first focus error signal obtained by receiving the first light is subtracted from the second focus error signal obtained by receiving the reflected light of the second light. In addition, the second focus servo control is performed by the driving of the second focus mechanism based on the second focus error signal from which the amount of corresponding to the first focus error signal is subtracted.

Accordingly, it is possible to prevent the residual error component of the first focus servo control system from overlapping the second focus servo control system.

As described above, according to the present application, it is possible to prevent the residual error component of the first focus servo control system for performing the focus servo control of the first light by the driving of the objective lens from overlapping the second focus servo control system for performing the focus servo control of the second light by changing the collimation of the second light incident to the objective lens.

As a result, it is possible to stably perform the focus servo control of the second light with higher precision.

Additional features and advantages are described herein, and will be apparent from the following Detailed Description and the figures.

BRIEF DESCRIPTION OF THE FIGURES

FIG. 6 is a diagram showing the waveforms of a focus error signal of a recording/reproducing light side and a focus error signal of a servo light side under a condition that focus servo of both a recording/reproducing side servo system (first servo system) and a servo light side servo system (second servo system) is applied;

FIG. 7 is a diagram showing the enlarged waveform of the focus error signal shown in FIG. 6;

DETAILED DESCRIPTION

Figure 1:
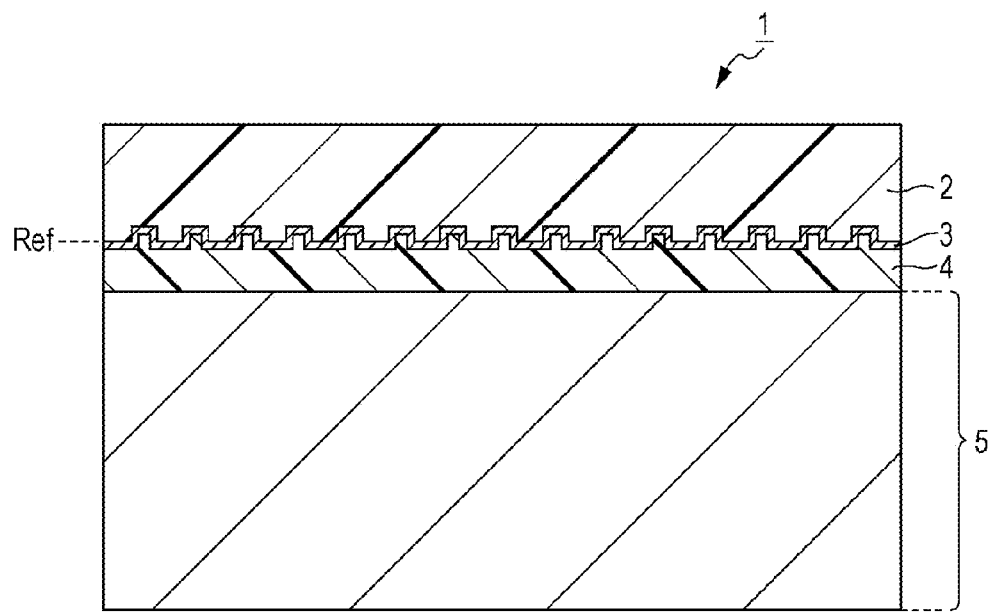
FIG. 1 is a cross-sectional structural diagram of an optical disc recording medium to be recorded/reproduced in an embodiment.

Embodiments of the present application will be described below in detail with reference to the drawings.
1. First embodiment
  1-1. Optical Disc Recording Medium to be Recorded/Reproduced in First Embodiment
  1-2. Regarding Servo Control During Recording/Reproduction
  1-3. Configuration of Optical Drive Device
  1-4. Discussion of Problems of Related Art
  1-5. Focus Servo Control of Embodiment
2. Second Embodiment
  2-1. Configuration of Optical Drive Device
3. Third Embodiment
  3-1. Optical Disc Recording Medium to be Recorded/Reproduced in Third Embodiment
  3-2. Configuration of Optical Drive Device
4. Modified Example 1. First Embodiment 1-1. Optical Disc Recording Medium to be Recorded/Reproduced in First Embodiment FIG. 1 is a cross-sectional structural diagram of an optical disc recording medium to be recorded/reproduced in a first embodiment.

In the first embodiment, the optical recording medium to be recorded/reproduced is a so-called bulk recording type optical recording medium and is hereinafter referred to as a bulk type recording medium 1.

The bulk type recording medium 1 is a disc-shaped optical recording medium, and a laser beam is irradiated to the rotated and driven bulk type recording medium 1 so as to perform mark recording (information recording). Reproduction of recorded information is performed by irradiating a laser beam to the rotated and driven bulk type recording medium 1.

The optical recording medium indicates a recording medium for recording/reproducing information by light irradiation.

As shown in FIG. 1, in the bulk type recording medium 1, a cover layer 2, a selective reflection film 3, an intermediate layer 4, and a bulk layer 5 are sequentially formed from an upper layer side.

In the present specification, the "upper layer side" indicates an upper layer side when a surface, which a laser beam enters from the side of an optical drive device (a recording/reproducing device 10, 50 or 60) as in the below-described embodiment, is an upper surface.

Although the term "depth direction" is used in the present specification, the term "depth direction" indicates a direction matched to a vertical direction according to the definition of the "upper layer side" (that is, a direction parallel to the incident direction of the laser beam from the optical drive device side: focus direction).

In the bulk type recording medium 1, the cover layer 2 is formed of, for example, resin such as polycarbonate or acrylic and, as shown, has a lower surface side having a cross-sectional shape of unevenness according to the formation of guide grooves for guiding a recording/reproduction position.

As the guide grooves, consecutive grooves or pit rows are formed. For example, if the guide grooves are formed of pit rows, position information (absolute position information: for example, rotation angle information, radius position information, or the like) is recorded by a combination of the lengths of pits and lands. Alternatively, if the guide grooves are formed of grooves, the grooves are periodically formed in a zigzag (wobble) manner so as to record position information by periodic information of the zigzag.

The cover layer 2 is generated by injection molding or the like using a stamper in which such guide grooves are formed (uneven shape).

The selective reflection film 3 is formed on a lower surface side of the cover layer 2, in which the guide grooves are formed.

As described above, in a bulk recording method, a light (servo laser beam) for obtaining a tracking or focus error signal based on the above guide grooves is irradiated separately from a light (recording/reproducing laser beam) for performing mark recording/reproduction with respect to the bulk layer 5 as a recording layer.

At this time, if the servo laser beam reaches the bulk layer 5, the mark recording in the bulk layer 5 may be adversely affected. Accordingly, a reflection film having selectivity for reflecting the servo laser beam and transmitting the recording/reproducing laser beam is necessary.

In the bulk recording method of the related art, a laser beam having a wavelength range different from those of the recording/reproducing laser beam and the servo laser beam is used and, in correspondence therewith, a selective reflection film having wavelength selectivity, which reflects a light having the same wavelength range as the servo laser beam and transmits a light having the other wavelength range, is used as the selective reflection film 3.

The bulk layer 5 as the recording layer is laminated (adhered) on the lower layer side of the selective reflection film 3 with the intermediate layer 4 interposed therebetween, which is formed of, for example, an adhesive material such as UV curing resin.

As the material (recording material) of the bulk layer 5, an optimal material is appropriately employed, for example, according to the employed bulk recording method such as the above-described positive type micro hologram method, the negative type micro hologram method or the void recording method.

In addition, the mark recording method of the optical disc recording medium of the present application is not specially limited and a certain method may be employed in the range of the bulk recording method.

In the bulk type recording medium 1 having the above configuration, the selective reflection film 3 having the cross-sectional shape of the unevenness according to the formation of the above guide grooves becomes a reflection surface which is a reference for performing the position control of the recording/reproducing laser beam based on the servo laser beam, as described below. In this sense, the surface on which the selective reflection film 3 is formed is hereinafter referred to as a reference surface Ref.

1-2. Regarding Servo Control During Recording/Reproduction

Subsequently, servo control during recording/reproduction of the bulk type recording medium 1 will be described with reference to FIG. 2.

Figure 2:
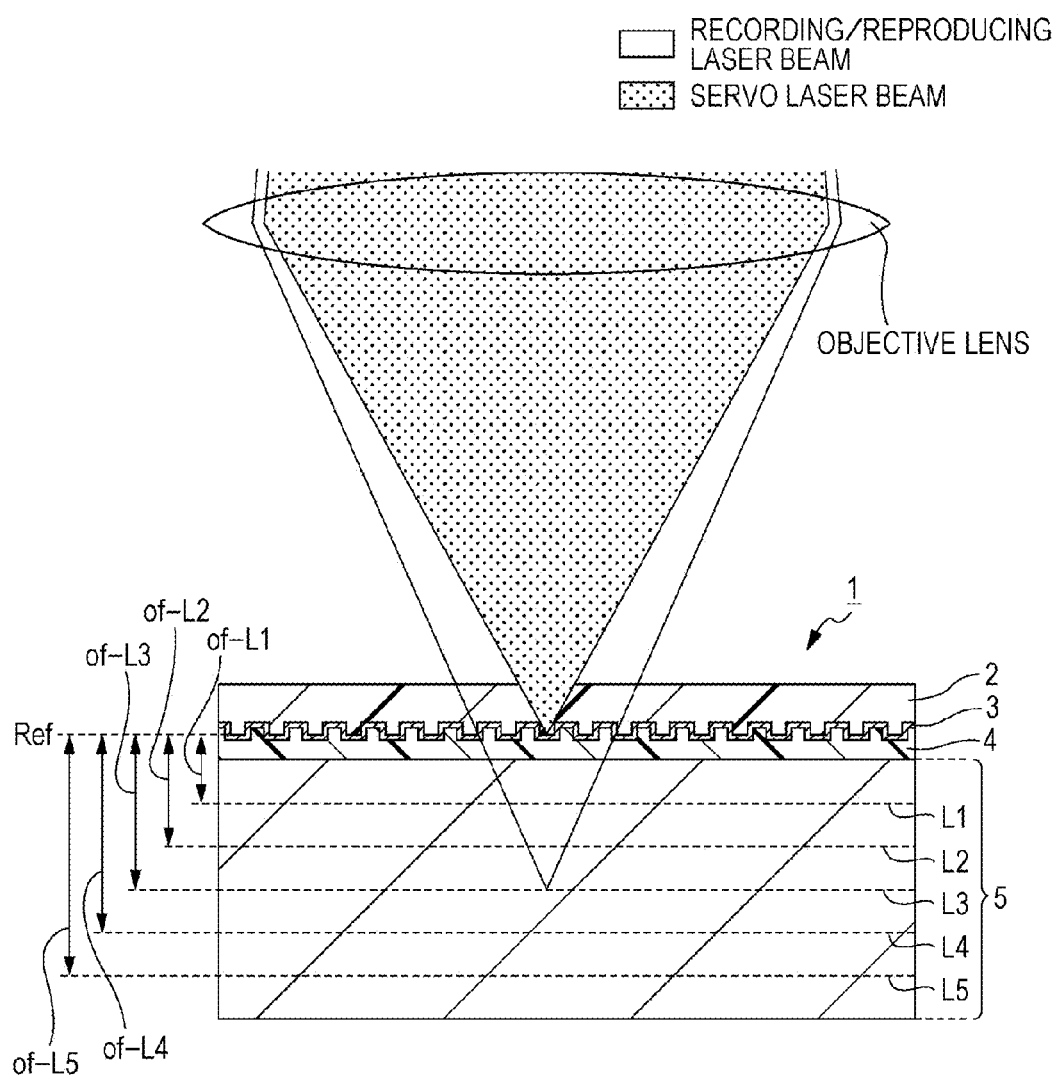
FIG. 2 is a diagram illustrating servo control.

First, in FIG. 2, as described above, a recording/reproducing laser beam for forming a recording mark and performing information reproduction from the recording mark and a servo laser beam having a wavelength range different from that of the recording/reproducing laser beam are irradiated to the bulk type recording medium 1.

Figure 3:
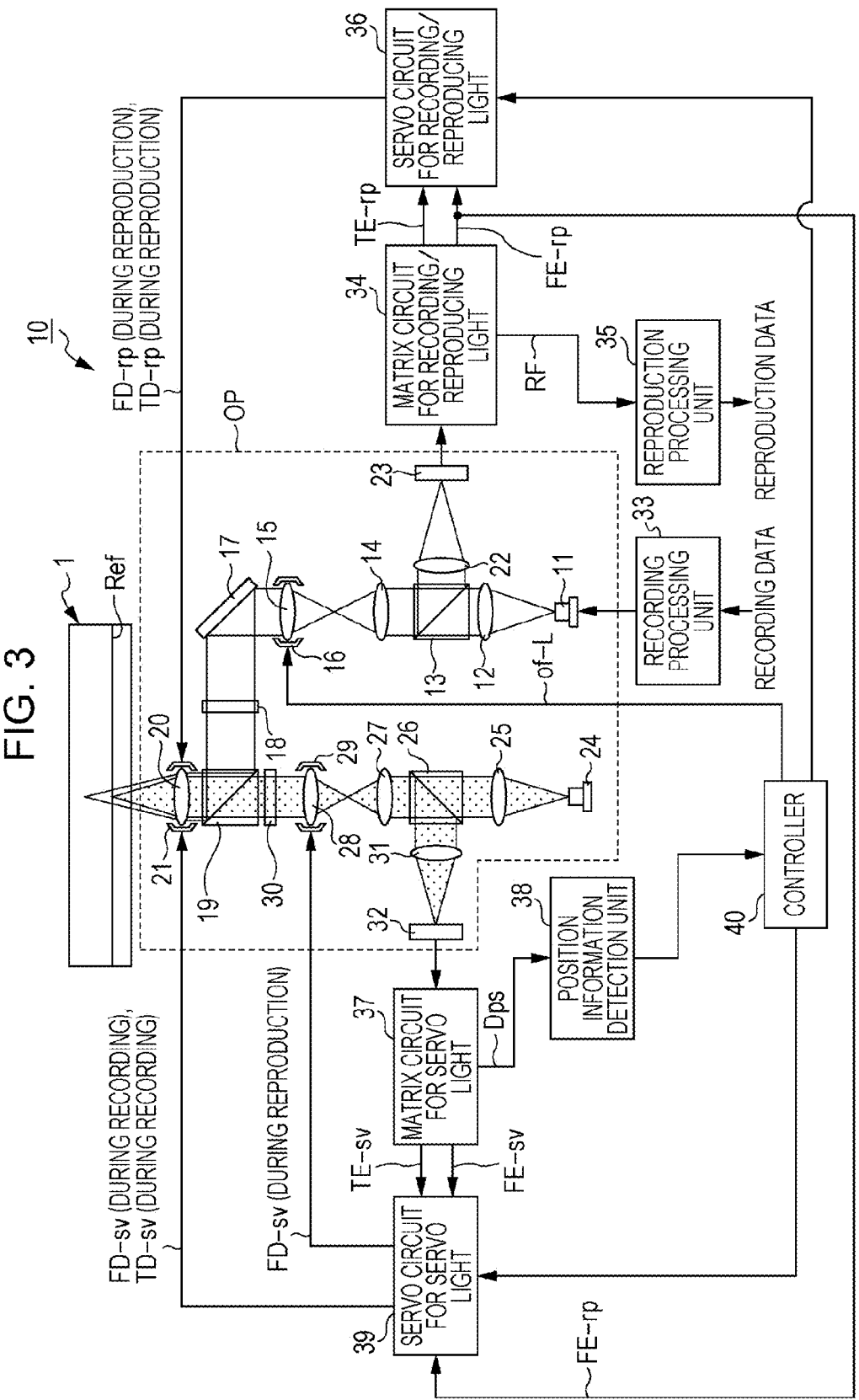
FIG. 3 is a diagram showing an internal configuration of an optical drive device according to a first embodiment.

As shown, the recording/reproducing laser beam and the servo laser beam are irradiated to the bulk type recording medium 1 through a common objective lens (an objective lens 20 of FIG. 3).

As shown in FIG. 1, in the bulk layer 5, for example, unlike a multi-layer disc for the present optical disc such as a Digital Versatile Disc (DVD) or a Blu-ray Disc (BD) (registered trademark), a reflection surface having guide grooves due to pits or grooves is not formed at each layer position to be recorded. Accordingly, during recording in which the mark is not yet formed, focus servo or tracking servo of the recording/reproducing laser beam is not performed using the reflected light of the recording/reproducing laser beam.

From this viewpoint, during recording of the bulk type recording medium 1, both tracking servo and focus servo of the recording/reproducing laser beam are performed using the reflected light of the servo laser beam.

In detail, in regard to the focus servo of the recording/reproducing laser beam during recording, first, a recording/reproducing light focus mechanism (lenses 14 and 15 and a lens driving unit 16 of FIG. 3) for independently changing only the focusing position of the recording/reproducing laser beam are provided and the focus mechanism for the recording/reproducing light is then controlled based on an offset "of" shown in the drawing using the selective reflection film 3 (reference surface Ref) as a reference.

Here, as described above, the recording/reproducing laser beam and the servo laser beam are irradiated to the bulk type recording medium 1 through the common objective lens. The focus servo of the servo laser beam is performed by controlling the objective lens using the reflected light from the reference surface Ref (selective reflection film 3) of the servo laser beam.

The recording/reproducing laser beam and the servo laser beam are irradiated through the common objective lens and the focus servo of the servo laser beam is performed by controlling the objective lens based on the reflected light from the reference surface Ref of the servo laser beam such that the focusing position of the recording/reproducing laser beam follows the surface wobbling of the bulk type recording medium 1. Thereafter, using the focus mechanism for the recording/reproducing laser beam, the focusing position of the recording/reproducing laser beam is offset by the value of the offset "of". Accordingly, the focusing position of the recording/reproducing laser beam follows a necessary depth position in the bulk layer 5.

In addition, for confirmation, the description will be given based on an ideal state in which the surface wobbling is not present.

In FIG. 2, as the example of the offsets "of" corresponding to the case where 5 mark forming layers (also called information recording layers) L are set in the bulk layer 5, the case where a first offset of-L1 corresponding to the layer position of a first information recording layer L1, a second offset of-L2 corresponding to the layer position of a second information recording layer L2, a third offset of-L3 corresponding to the layer position of a third information recording layer L3, a fourth offset of-L4 corresponding to the layer position of a fourth information recording layer L4 and a fifth offset of-L5 corresponding to the layer position of a fifth information recording layer L5 are set is shown. By driving the focus mechanism for the recording/reproducing light using the value of the offset "of", the mark forming position (recording position) in a depth direction may be adequately selected from the layer position as the first information recording layer L1, the layer position as the second information recording layer L2, the layer position as the third information recording layer L3, the layer position as the fourth information recording layer L4 and the layer position as the fifth information recording layer L5.

In regard to the tracking servo of the recording/reproducing laser beam during recording, as described above, the tracking servo control of the objective lens using the reflected light of the servo laser beam from the reference surface Ref is performed using the point that the recording/reproducing laser beam and the servo laser beam are irradiated through the common objective lens. That is, by the tracking servo control of the objective lens using the reflected light of the servo laser beam from the reference surface Ref, the focal point position of the recording/reproducing laser beam is controlled to a position just below the guide grooves formed in the reference surface Ref.

During reproduction, the following servo control is performed.

During reproduction of the bulk type recording medium 1 in which the mark string is already formed, the focus servo control of the recording/reproducing laser beam may be performed with respect to the recorded mark string. Accordingly, the focus servo control of the recording/reproducing laser beam during reproduction is performed by controlling the objective lens based on the reflected light of the recording/reproducing laser beam, such that the focusing position follows the mark string (information recording layer L) to be reproduced.

In addition, the tracking servo control of the recording/reproducing laser beam during reproduction is performed by driving the objective lens based on the reflected light of the recording/reproducing laser beam, that is, is performed such that the focal point position of the recording/reproducing laser beam follows the mark string formed in the information recording layer L.

During the reproduction of the information recorded in the bulk layer 5, for example, for the reading of the absolute position information, the servo control of the servo laser beam is performed.

As described with reference to FIG. 22, during recording, due to follow-up to surface wobbling by the focus servo control, the objective lens is displaced in a focus direction such that the mark string is not parallel to the reference surface Ref. That is, when the focus servo control of the objective lens based on the reflected light of the recording/reproducing laser beam is performed during reproduction, the focusing position of the servo laser beam does not match to the reference surface Ref.

Figure 23:
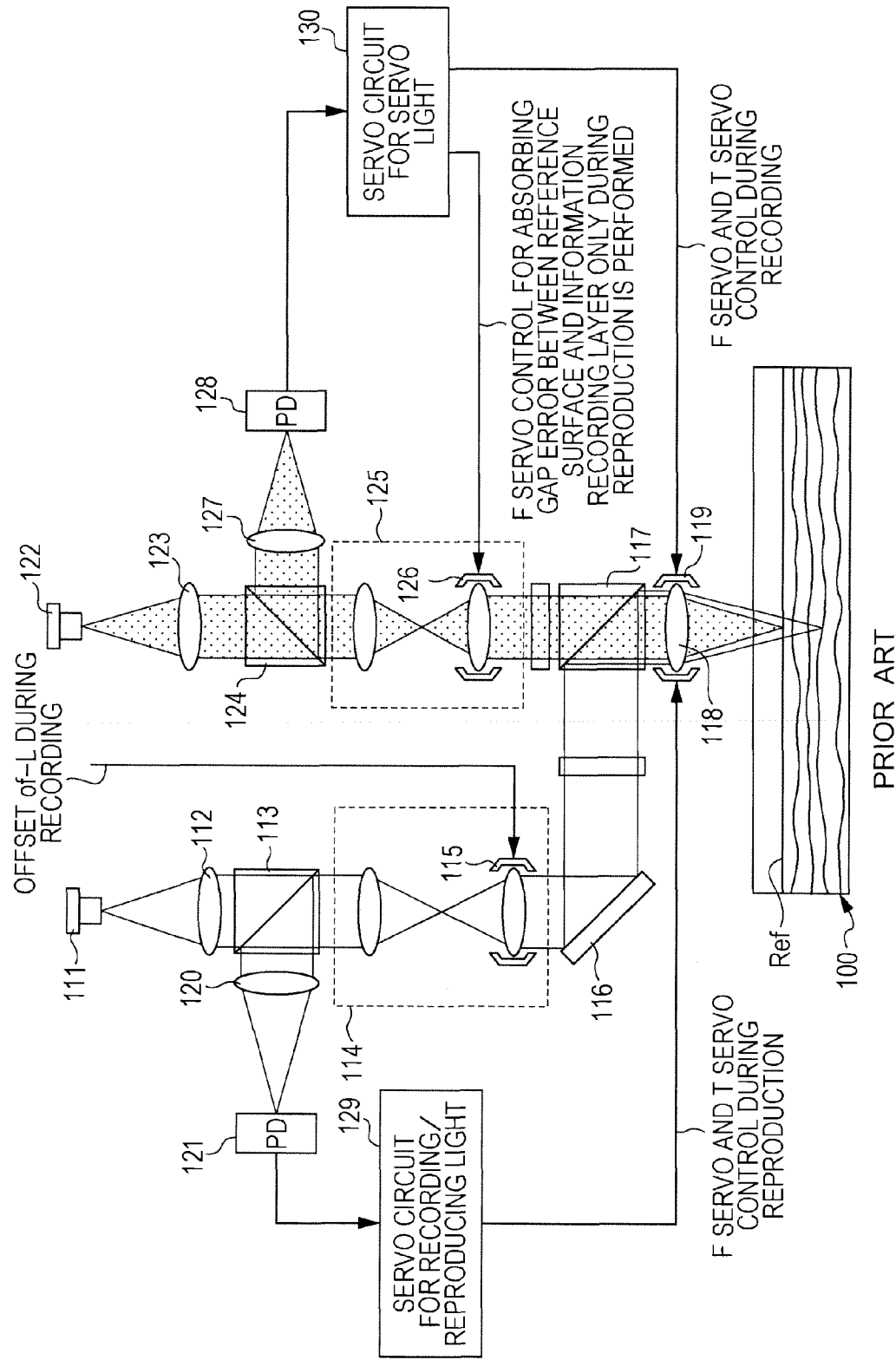
FIG. 23 is a diagram showing the configuration of an optical drive device of the related art.

To this end, the focus servo control of the servo laser beam during reproduction is performed by separately providing the focus mechanism for the servo light shown in FIG. 23 and controlling the focus mechanism for the servo light such that the servo laser beam focuses on the reference surface Ref.

In detail, the focus servo control is performed by providing the focus mechanism for the servo light for changing the collimation of the servo laser beam incident to the objective lens and controlling the focus mechanism for the servo light such that the focusing position of the servo laser beam matches to the reference surface Ref based on the reflected light of the servo laser beam.

Figure 22:
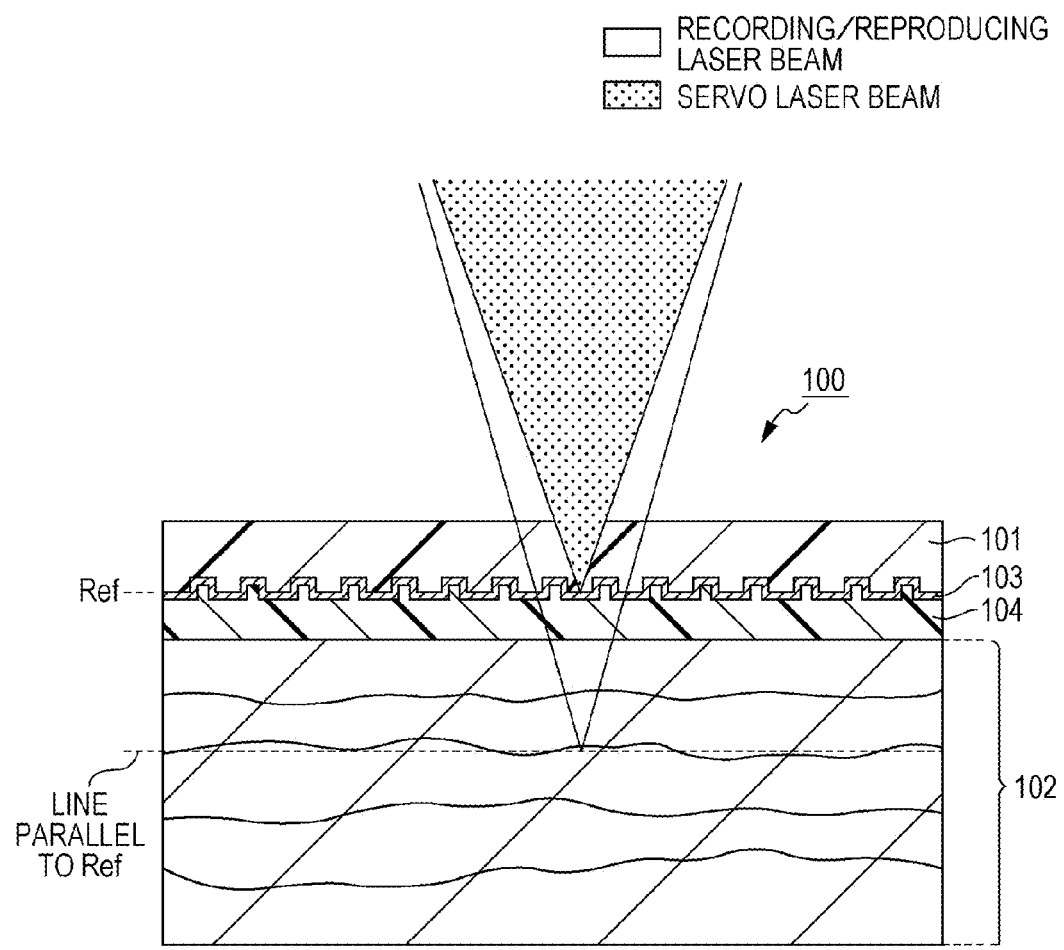
FIG. 22 is a diagram showing a relationship between a reference surface and a recorded mark string.

By performing the focus servo control using the focus mechanism for the servo light, control for absorbing the gap error between the reference surface Ref and the recorded mark string shown in FIG. 22 is realized.

1-3. Configuration of Optical Drive Device

FIG. 3 is a diagram showing an internal configuration of an optical drive device (hereinafter, referred to as a recording/reproducing device 10) for performing recording/reproduction with respect to the bulk type recording medium 1 shown in FIG. 1 as the first embodiment.

In FIG. 3, the bulk type recording medium 1 mounted in the recording/reproducing device 10 is set such that a center hole is clamped at a predetermined position of the recording/reproducing device 10 and is held so as to be rotated and driven by a spindle motor (not shown).

In the recording/reproducing device 10, an optical pickup OP for irradiating the recording/reproducing laser beam and the servo laser beam to the bulk type recording medium 1 rotated and driven by the spindle motor is provided.

In the optical pickup OP, a recording/reproducing laser 11 which is a light source of the recording/reproducing laser beam for performing information recording by a mark and reproduction of information recorded by a mark and a servo laser 24 which is a light source of the servo laser beam as a light for performing position control using the guide grooves formed in the reference surface Ref are provided.

Here, as described above, the recording/reproducing laser beam and the servo laser beam have different wavelengths. In this example, the wavelength of the recording/reproducing laser beam is about 405 nm (so-called violet-blue laser beam) and the wavelength of the servo laser beam is about 650 nm (red laser beam).

In the optical pickup OP, the objective lens 20 which is an output terminal of the recording/reproducing laser beam and the servo laser beam to the bulk type recording medium 1 is provided.

In addition, a light-sensing portion 23 for the recording/reproducing light, which senses the reflected light from the bulk type recording medium 1 of the recording/reproducing laser beam, and a light-sensing portion 32 for the servo light, which senses the reflected light from the bulk type recording medium 1 of the servo laser beam, are provided.

In addition, in the optical pickup OP, an optical system for guiding the recording/reproducing laser beam emitted from the recording/reproducing laser 11 to the objective lens 20 and guiding the reflected light of the recording/reproducing laser beam from the bulk type recording medium 1 incident to the objective lens 20 to the light-sensing portion 23 for the recording/reproducing light is formed.

In detail, the recording/reproducing laser beam emitted from the recording/reproducing laser 11 becomes a parallel light through a collimation lens 12 so as to enter the polarization beam splitter 13. The polarization beam splitter 13 is configured to transmit the recording/reproducing laser beam incident from the recording/reproducing laser 11 side.

The recording/reproducing laser beam transmitting through the polarization beam splitter 13 enters an expander including a fixed lens 14, a movable lens 15, and a lens driving unit 16. This expander performs independent focus control with respect to the recording/reproducing laser beam by arranging the fixed lens 14 to be located close to the recording/reproducing laser 11, which is the light source, arranging the movable lens 15 to be located far from the recording/reproducing laser 11, and driving the movable lens 15 in a direction parallel to the optical axis of the recording/reproducing laser beam by the lens driving unit 16. This expander corresponds to the above-described recording/reproducing focus mechanism.

As described below, the focus mechanism for the recording/reproducing light (the lens driving unit 16) is driven by a controller 40 according to the value of the offset of-L set in correspondence with the information recording layer L as a target.

The recording/reproducing laser beam passing through the focus mechanism for the recording/reproducing light is reflected from a mirror 17 and enters a dichroic prism 19 through a ¼ wavelength plate 18.

The dichroic prism 19 is configured such that the selective reflection surfaces thereof reflects a light with the same wavelength range as the recording/reproducing laser beam and transmits a light with the other wavelength. Accordingly, the incident recording/reproducing laser beam is reflected from the dichroic prism 19.

The recording/reproducing laser beam reflected from the dichroic prism 19 is irradiated onto the bulk type recording medium 1 through the objective lens 20, as shown.

In the objective lens 20, a biaxial actuator 21 for displaceably holding the objective lens 20 in the focus direction (the direction abutting on or separated from the bulk type recording medium 1) and the tracking direction (the direction perpendicular to the focus direction: the radius direction of the bulk type recording medium 1) is provided.

The biaxial actuator 21 includes a focus coil and a tracking coil and displaces the objective lens 20 in the focus direction and the tracking direction by respectively applying driving signals (the below-described driving signals FD and TD) to the focus coil and the tracking coil.

During reproduction, by irradiating the recording/reproducing laser beam to the bulk type recording medium 1 as described above, the reflected light of the recording/reproducing laser beam is obtained from the bulk type recording medium 1 (the mark string recorded in the information recording layer L to be reproduced in the bulk layer 5). The reflected light of the recording/reproducing laser beam obtained by the above operation is guided to the dichroic prism 19 through the objective lens 20 and is reflected from the dichroic prism 19.

The reflected light of the recording/reproducing laser beam reflected from the dichroic prism 19 passes through the ¼ wavelength plate 18, the mirror 17 and the focus mechanism for the recording/reproducing light (the movable lens 15 and the fixed lens 14) and then enters into the polarization beam splitter 13.

The polarization direction of the reflected light (returning light) of the recording/reproducing laser beam incident to the polarization beam splitter 13 is different from that of the recording/reproducing laser beam (forward light) incident from the recording/reproducing laser 11 side to the polarization beam splitter 13 by 90°, by the operation by the ¼ wavelength plate 18 and the reflection operation of the bulk type recording medium 1. As a result, the reflected light of the incident recording/reproducing laser beam is reflected from the polarization beam splitter 13.

The reflected light of the recording/reproducing laser beam reflected from the polarization beam splitter 13 is focused on the detection surface of the light-sensing portion 23 for the recording/reproducing light through the focusing lens 22.

In the optical pickup OP, in addition to the above-described configuration of the optical system for the recording/reproducing laser beam, an optical system for guiding the servo laser beam emitted from the servo laser 24 to the objective lens 20 and guiding the reflected light of the servo laser beam from the bulk type recording medium 1 incident to the objective lens 20 to the light-sensing portion 32 for the servo light is formed.

As shown, the servo laser beam emitted from the servo laser 24 becomes a parallel light through a collimation lens 25 and enters into a polarization beam splitter 26. The polarization beam splitter 26 is configured so as to transmit the servo laser beam (forward light) incident from the servo laser 24 side.

The servo laser beam transmitting through the polarization beam splitter 26 enters into the expander including a fixed lens 27, a movable lens 28 and a lens driving unit 29.

This expander performs independent focus control with respect to the servo laser beam by arranging the fixed lens 27 to be located close to the servo laser 24, which is the light source, arranging the movable lens 28 to be located far from the servo laser 24, and driving the movable lens 28 in a direction parallel to the optical axis of the servo laser beam by the lens driving unit 29. This expander corresponds to the above-described focus mechanism for the servo light.

The focus mechanism for the servo light (the lens driving unit 29) is driven by the below-described servo circuit 39 for the servo light during reproduction of the bulk type recording medium 1.

The servo laser beam transmitting through the focus mechanism for the servo light enters the dichroic prism 19 through a ¼ wavelength plate 30. As described above, the dichroic prism 19 is configured so as to reflect a light with the same wavelength range as the recording/reproducing laser beam and transmit a light with the other wavelength. Accordingly, the servo laser beam transmits through the dichroic prism 19 so as to be irradiated to the bulk type recording medium 1 through the objective lens 20.

The reflected light (the reflected light from the reference surface Ref) of the servo laser beam obtained by irradiating the servo laser beam to the bulk type recording medium 1 passes through the objective lens 20, transmits the dichroic prism 19 and enters into the polarization beam splitter 26 through the ¼ wavelength plate 30 and the focus mechanism for the servo light (the movable lens 28 and the fixed lens 27).

Similarly to the recording/reproducing laser beam, the polarization direction of the reflected light (returning light) of the servo laser beam incident from the bulk type recording medium 1 side is different from that of the forward light by 90°, by the operation of the ¼ wavelength plate 30 and the reflection operation of the bulk type recording medium 1, and thus the reflected light of the servo laser beam as the returning light is reflected from the polarization beam splitter 26.

Thus, the reflected light of the servo laser beam reflected from the polarization beam splitter 26 is focused on the detection surface of the light-sensing portion 32 for the servo light through the focusing lens 31.

Although the description is omitted, practically, in the recording/reproducing device 10, a slide driving unit for sliding and driving the overall above-described optical pickup OP in the tracking direction is provided so as to widely displace the irradiation position of the laser beam by the driving of the optical pickup OP by the slide driving unit.

In the recording/reproducing device 10, together with the above-described optical pickup OP, a recording processing unit 33, a matrix circuit 34 for a recording/reproducing light, a reproduction processing unit 35, a servo circuit 36 for a recording/reproducing light, a matrix circuit 37 for a servo light, a position information detection unit 38, a servo circuit 39 for a servo light, and a controller 40 are provided.

First, data to be recorded (recording data) with respect to the bulk type recording medium 1 is input to the recording processing unit 33. The recording processing unit 33 performs addition of an error correction code or predetermined recording modulation encoding with respect to the input recording data and obtains a recording modulation data string which is a binary data string of "0" and "1" actually recorded in the bulk type recording medium 1.

The recording processing unit 33 performs emission drive of the recording/reproducing laser 11 based on the generated recording modulation data string according to an instruction from the controller 40.

The matrix circuit 34 for the recording/reproducing light includes a current/voltage conversion circuit, a matrix calculation/amplification circuit and the like in correspondence with the output current from a plurality of light-sensing elements as the light-sensing portion 23 for the recording/reproducing light, and generates necessary signals by the matrix calculation process.

In detail, a radio frequency signal (hereinafter, referred to as a reproduction signal RF) corresponding to a reproduction signal reproducing the recording modulation data string, a focus error signal FE-rp for focus servo control, and a tracking error signal TE-rp for tracking servo control are generated.

The reproduction signal RF generated by the matrix circuit 34 for the recording/reproducing light is supplied to the reproduction processing unit 35.

The focus error signal FE-rp and the tracking error signal TE-rp are supplied to the servo circuit 36 for the recording/reproducing light.

In particular, in this example, although the focus error signal FE-rp is branched and supplied with respect to the below-described servo circuit 39 for the servo light, this will be described later.

The reproduction processing unit 35 performs a reproduction process for restoring the above-described recording data, such as a binarization process, a process of decoding the recording modulation code, or an error correction process, with respect to the reproduction signal RF and obtains the reproduction data reproducing the recording data.

The servo circuit 36 for the recording/reproducing light generates a focus servo signal FS-rp and a tracking servo signal TS-rp based on the focus error signal FE-rp and the tracking error signal TE-rp supplied from the matrix circuit 34 and drives the focus coil and the tracking coil of the biaxial actuator 21 based on a focus drive signal FD-rp and the tracking drive signal TD-rp based on the focus servo signal FS-rp and the tracking servo signal TS-rp, thereby performing focus servo control and tracking servo control of the recording/reproducing laser beam.

As can be understood from the above description, the servo control of the biaxial actuator 21 (objective lens 20) based on the reflected light of the recording/reproducing laser beam is performed only during reproduction.

The servo circuit 36 for the recording/reproducing light turns off a tracking servo loop according to the instruction from the controller 40 during reproduction and applies a jump pulse to the tracking coil so as to execute a track jump operation or perform tracking servo pull-in control or the like. In addition, focus servo pull-in control or the like is performed.

In regard to the servo laser beam side, the matrix circuit 37 for the servo light generates a necessary signal based on the light-sensing signals from the plurality of light-sensing elements of the above-described light-sensing portion 32 for the servo light.

In detail, the matrix circuit 37 for the servo light generates a focus error signal FE-sv and a tracking error signal TE-sv for focus/tracking servo control.

In addition, a position information detection signal Dps for performing the detection of absolute position information recorded in the reference surface Ref is generated.

The position information detection signal Dps is supplied to the position information detection unit 38 as shown. The position information detection unit 38 detects the absolute position information recorded in the reference surface Ref based on the position information detection signal Dps. The detected absolute position information is supplied to the controller 40.

The focus error signal FE-sv and the tracking error signal TE-sv generated by the matrix circuit 37 for the servo light are supplied to the servo circuit 39 for the servo light.

The servo circuit 39 for the servo light generates the focus servo signal FS-sv and the tracking servo signal TS-sv based on the focus error signal FE-sv and the tracking error signal TE-sv.

During reproduction, according to an instruction from the controller 40, the focus coil and the tracking coil of the biaxial actuator 21 are driven based on the focus drive signal FD-sv and the tracking drive signal TD-sv generated based on the focus servo signal FS-sv and the tracking servo signal TS-sv, thereby performing the focus servo control and the tracking servo control of the servo laser beam.

In addition, during reproduction, according to an instruction from the controller 40, the lens driving unit 29 of the above-described focus mechanism for the servo light is driven based on the focus drive signal FD-sv generated based on the focus servo signal FS-sv, thereby performing focus servo control of the servo laser beam.

In addition, the servo circuit 39 for the servo light turns off the tracking servo loop according to the instruction from the controller 40 during recording and applies a jump pulse to the tracking coil of the biaxial actuator 21 so as to execute a track jump operation or perform tracking servo pull-in control or the like. In addition, focus servo pull-in control or the like is performed.

In addition, during reproduction, the lens driving unit 29 is driven and controlled according to an instruction from the controller 40 so as to perform focus servo pull-in control for the reference surface Ref.

Although, in the first embodiment, the focus error signal FE-rp from the matrix circuit 34 for the recording light is input to the servo circuit 39 for the servo light, the content of the process performed by the servo circuit 39 for the servo light with respect to the input focus error signal FE-rp or another internal configuration of the servo circuit 39 for the servo light will be described later.

The controller 40 includes a micro computer including, for example, a Central Processing Unit (CPU) or a memory (storage device) such as a Read Only Memory (ROM), and executes a control process according to a program stored in the ROM or the like so as to perform the overall control of the recording/reproducing device 10.

In detail, the controller 40 performs the control (setting) of the focusing position of the recording/reproducing laser beam based on the value of the offset "of" set in correspondence with each layer position in advance as described with reference to FIG. 2. In more detail, the controller 40 drives the lens driving unit 16 based on the value of the offset "of-L" set in correspondence with the layer position to be recorded or reproduced so as to perform the selection of the recording/reproducing position in the depth direction.

As described above, the focus/tracking servo control of the objective lens 20 during recording is performed based on the reflected light of the servo laser beam. Accordingly, the controller 40 instructs the servo circuit 39 for the servo light to execute the focus servo control and the tracking servo control of the objective lens 20 and instructs the servo circuit 36 for the recording/reproducing light not to execute the focus servo control and the tracking servo control of the objective lens 20.

On the other hand, the controller 40 instructs the servo circuit 36 for the recording/reproducing light to execute the focus servo control and the tracking servo control of the objective lens 20. In addition, during reproduction, the controller 40 instructs the servo circuit 39 for the servo light to execute only the focus servo control of the focus mechanism for the servo light (the lens driving unit 29).

1-4. Discussion of Problems of Related Art

As can be understood from the above description, the recording/reproducing device 10 of the present embodiment employs a configuration for irradiating both a first light (in this case, a recording/reproducing laser beam) and a second light (in this case, a servo laser beam) to the optical disc recording medium through the common objective lens and driving a first focus mechanism (biaxial actuator 21) which is the focus mechanism of the objective lens so as to perform the focus servo control of the first light and driving a second focus mechanism (in this case, the focus mechanism for the servo light) for changing the collimation of the second light incident to the objective lens so as to perform the focus servo control of the second light.

If such a configuration is employed, the residual error component of the first focus servo system for performing the focus servo control of the first light by the driving of the first focus mechanism (objective lens) overlaps the second focus servo system for performing the focus servo control of the second light by the driving of the second focus mechanism and thus the servo performance of the second focus servo system deteriorates.

Figure 4:
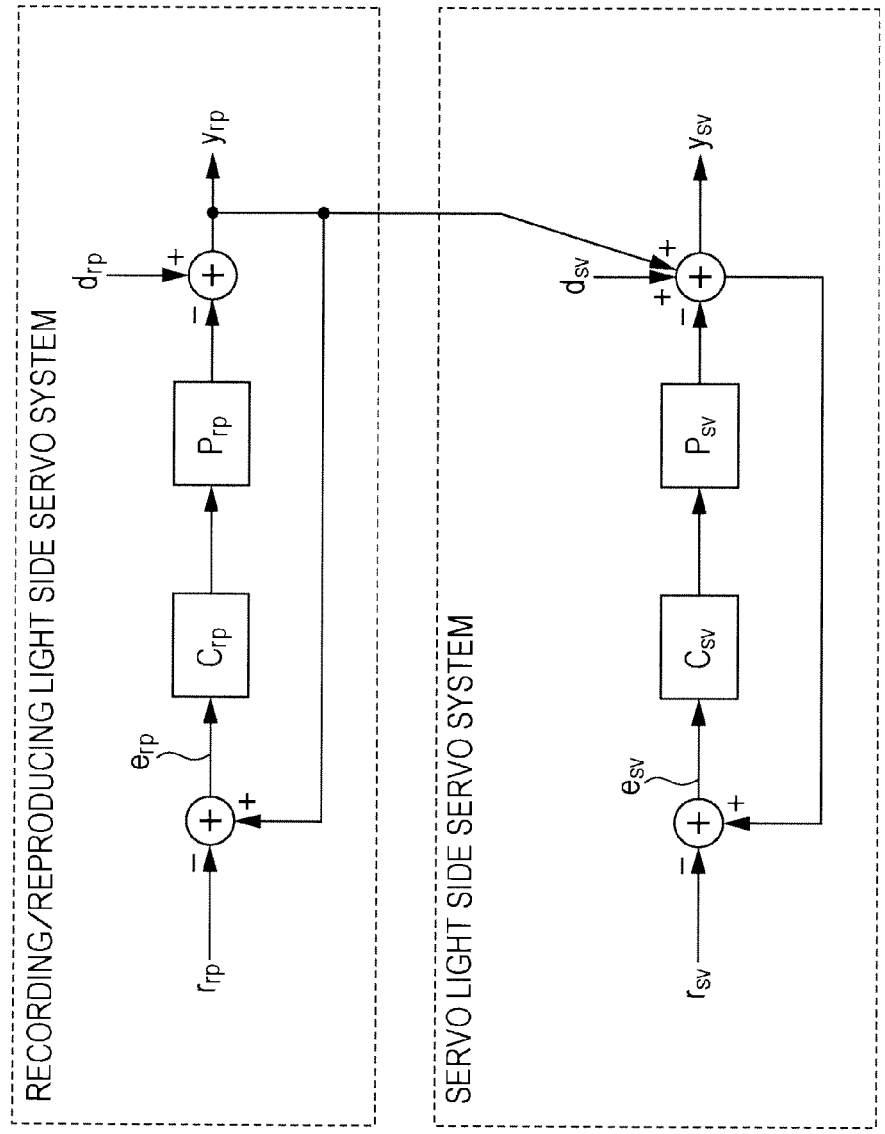
FIG. 4 is a diagram showing models of a recording/reproducing light side focus servo system and a servo light side focus servo system of the related art.

FIG. 4 is a diagram showing models of the first focus servo system (recording/reproducing light side servo system) and the second focus servo system (servo light side servo system) formed in the recording/reproducing device 10 shown in FIG. 3.

In FIG. 4, "$r_{rp}$" in the drawing denotes a control target value of the recording/reproducing light side servo system and, in this case, $r_{rp}=0$. In addition, "$e_{rp}$" in the drawing denotes the value of the focus error signal FE-rp of the recording/reproducing light side servo system.

In addition, "$c_{rp}$" in the drawing denotes unitization of a transfer function corresponding to focus servo calculation (control calculation) of the recoding/reproducing light side servo system into a block and is hereinafter referred to as a block $C_{rp}$. In addition, "$P_{rp}$" in the drawing denotes unitization of a transfer function corresponding to response characteristics of the first focus mechanism (the biaxial actuator 21) into a block and is hereinafter referred to as a block P.

In addition, "$d_{rp}$" indicates disturbance applied to the recording/reproducing light side servo system and "$y_{rp}$" denotes the output of the recording/reproducing side servo system (corresponding to the output of the light-sensing portion 23 for the recording/reproducing light).

Similarly, in the servo light side servo system, "$r_{sv}$" denotes a control target value ($r_{sv}=0$) of the servo light side servo system and "$e_{sv}$" denotes the value of the focus error signal FE-sv of the servo light side servo system. In addition, "$c_{sv}$" denotes unitization of a transfer function corresponding to a focus servo calculation (control calculation) of the servo light side servo system into a block and "$P_{sv}$" denotes unitization of a transfer function corresponding to response characteristics of the second focus mechanism (the focus mechanism for the servo light: the lens driving unit 29).

In addition "$d_{sv}$" denotes disturbance applied to the servo light side servo system.

Since the following of disc surface wobbling is realized by the recording/reproducing light side servo system, the disturbance "$d_{sv}$" of the servo light side servo system corresponds to a gap error between the reference surface Ref and the recording mark string shown in FIG. 22.

In addition, "$y_{sv}$" indicates the output of the servo light side servo system (corresponding to the output of the light-sensing portion 32 for the servo light)

As shown in FIG. 6, the output $y_{rp}$ and the value $e_{rp}$ of the focus error signal FE of the recording/reproducing light side servo system is expressed by the following equations.

$$-e_{rp}C_{rp}P_{rp}+d_{rp}=y_{rp} \quad \text{Equation 1}$$

$$e_{rp}=y_{rp}-r_{rp} \quad \text{Equation 2}$$

On the other hand, in the servo light side servo system, in addition to "$d_{sv}$" corresponding to the gap error between the recording mark string and the reference surface Ref as the disturbance component, the output $y_{rp}$ corresponding to the residual error component of the recording/reproducing light side servo system is applied as shown in the drawing. That is, the relationship between the output $y_{sv}$ and the value $e_{sv}$ of the focus error signal FE of the servo light side servo system is expressed as follows.

$$-e_{sv}C_{sv}P_{sv}+d_{sv}+y_{rp}=y_{sv} \quad \text{Equation 3}$$

$$e_{sv}=y_{sv}-r_{sv} \quad \text{Equation 4}$$

Figure 5A:
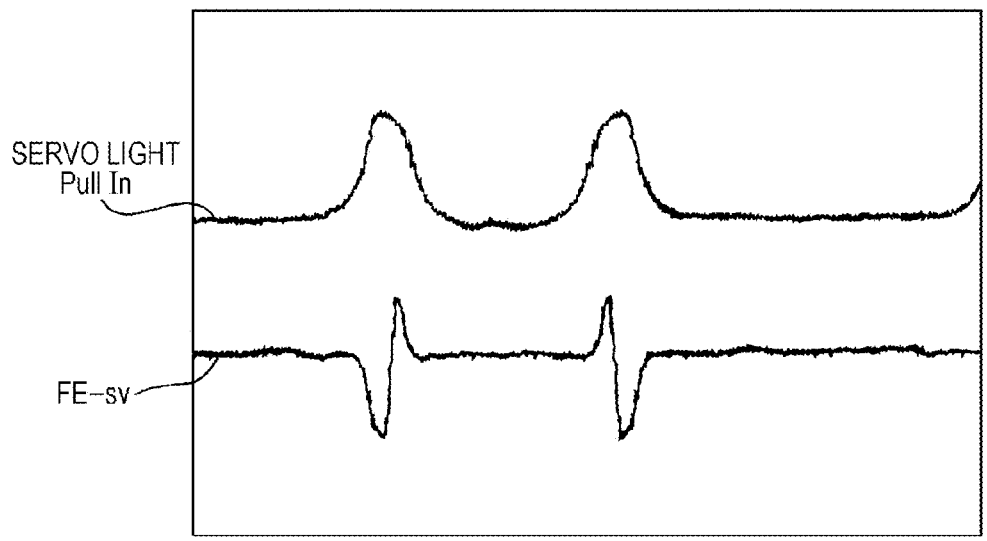
FIGS. 5A and 5B are diagrams showing the waveforms of a pull-in signal and a focus error signal of the servo light side under a condition that focus servo of only a recording/reproducing side servo system (first servo system) is applied.
Figure 5B:
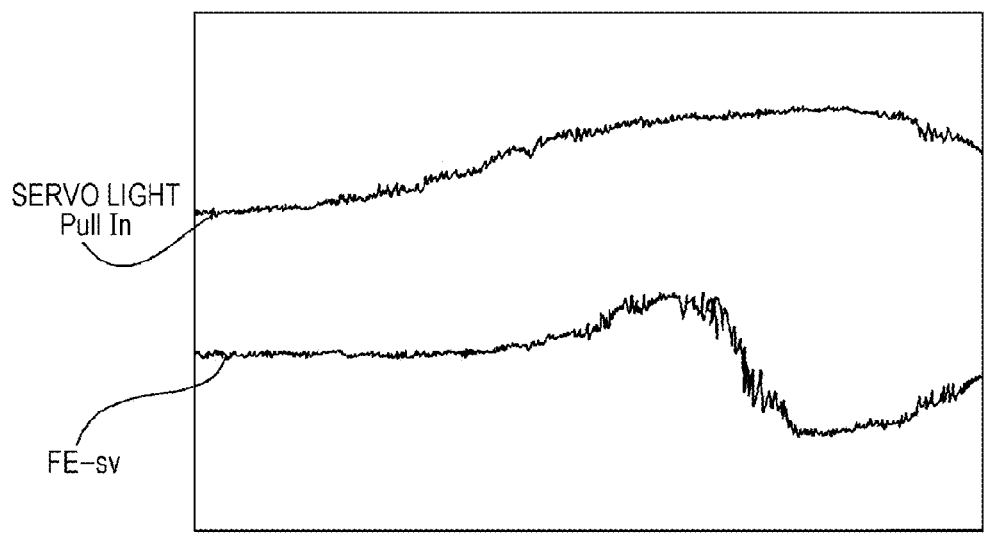

FIG. 5A shows the waveforms of the pull-in signal and the focus error signal FE-sv of the servo laser beam in a state in which focus servo for the necessary information recording layer L in the bulk layer 5 is applied by the recording/reproducing laser beam. FIG. 5B shows the enlarged waveforms of an S-shaped section shown in FIG. 5A.

As can be seen from FIGS. 5A and 5B, in a state in which focus servo is applied only by the recording/reproducing light side servo system during reproduction, the focusing position of the servo laser beam does not follow the reference surface Ref and the pull-in signal and the value of the focus error signal FE-sv of the servo laser beam are changed in a necessary period.

At this time, referring to the enlarged view of FIG. 5B, it can be seen that a specific signal is leaked in the focus error signal FE-sv.

Under such a state, if the focus servo of the servo light side servo system is turned on, the relationship between the focus error signal FE-rp of the recording/reproducing laser beam and the focus error signal FE-sv of the servo laser beam is shown in FIG. 6.

It can be seen from FIG. 6 that the focus error signal FE-sv obviously deteriorates compared with the focus error signal FE-rp.

FIG. 7 is an enlarged diagram of the focus error signal FE-rp and the focus error signal FE-sv shown in FIG. 6. It can be seen from FIG. 7 that the focus error signal FE-rp and the focus error signal FE-sv have significant correlativity.

That is, it can be understood that signal disturbance for deteriorating the performance of the servo light side servo system coincides with the residual error component of the recording/reproducing light side servo system.

As described above, in order to suppress the deterioration of the servo performance due to the residual error component, the residual error may be reduced by increasing the band of the recording/reproducing light side servo system.

However, the band of the recording/reproducing light side servo system may not be sufficiently increased due to the influence of the resonance of the biaxial actuator 21 or the like. In addition, even when the band of the servo system is increased, in practice, since it is difficult to infinitely increase DC gain, the residual error may not become zero.

In the method of increasing the band of the recording/reproducing light side focus servo system, the disturbance component leaked to the servo light side servo system may not essentially become zero and, as a result, the performance deterioration of the servo light side servo system may not be fundamentally prevented.

1-5. Focus Servo Control of Embodiment

In the present embodiment, in the case where the first focus servo system for driving the first focus mechanism which is the focus mechanism of the objective lens so as to the focus servo control of the first light and the second focus servo system for driving the second focus mechanism for changing the collimation of the second light incident to the objective lens so as to perform the focus servo control of the second light are formed, a method of subtracting the first focus error signal obtained by the first focus servo system from the second focus error signal obtained by the second focus servo system and performing the focus servo control by the second focus servo system based on the second focus error signal subjected to the subtraction is proposed.

Figure 8:
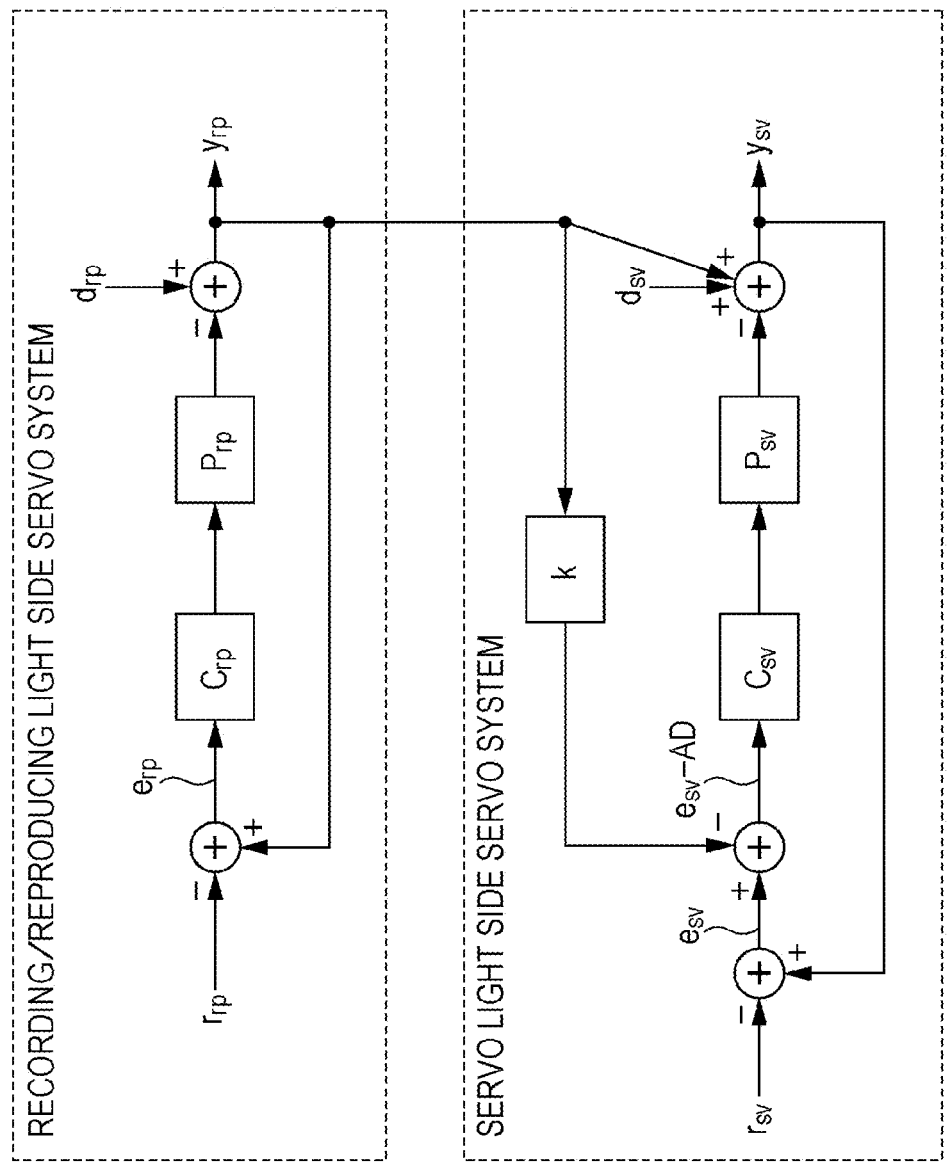
FIG. 8 is a diagram of the model of a recording/reproducing light side focus servo system and a servo light side focus servo system according to an embodiment.

FIG. 8 is a diagram showing the model of the focus servo system according to an embodiment which performs a process of subtracting such an error signal.

In addition, in FIG. 8, the portions described in FIG. 4 are denoted by the same reference numerals and thus the description thereof will be omitted.

In FIG. 8, the configuration of the recording/reproducing light side servo system is equal to that of the related art.

In the present embodiment, in the servo light side servo system, as shown in the drawing, a configuration for multiplying the output $y_{rp}$ of the recording/reproducing light side servo system by a necessary coefficient k and subtracting the multiplied result from the focus error signal FE-sv is added.

The output $y_{rp}$ of the recording/reproducing light side servo system corresponds to the output of the light-sensing portion 23 for the recording/reproducing light and, in this case, becomes equal to the focus error signal FE-rp because $r_{rp}=0$.

In addition, the coefficient k is to absorb a difference in servo gain between the recording/reproducing light side servo system and the servo light side servo system and is obtained in advance by experiments or the like. In addition, this coefficient k may represent a degree of interference from the first focus servo system side to the second focus servo system side.

As shown in FIG. 8, in the servo light side servo system, if the component corresponding to the focus error signal FE-rp of the recording/reproducing light side servo system is subtracted from the focus error signal FE-sv, it is possible to eliminate the residual error component of the recording/reproducing light side servo system which may be applied to the servo light side servo system.

That is, by executing the focus servo control by the servo light side servo system based on the signal (focus error component $e_{sv}$-AD in the drawing) in which the component corresponding to the focus error signal FE-rp is eliminated from the focus error signal FE-sv, it is possible to efficiently prevent the deterioration of the servo performance of the servo light side servo system due to leakage of the residual error component from the recording/reproducing light side servo system.

Figure 9:
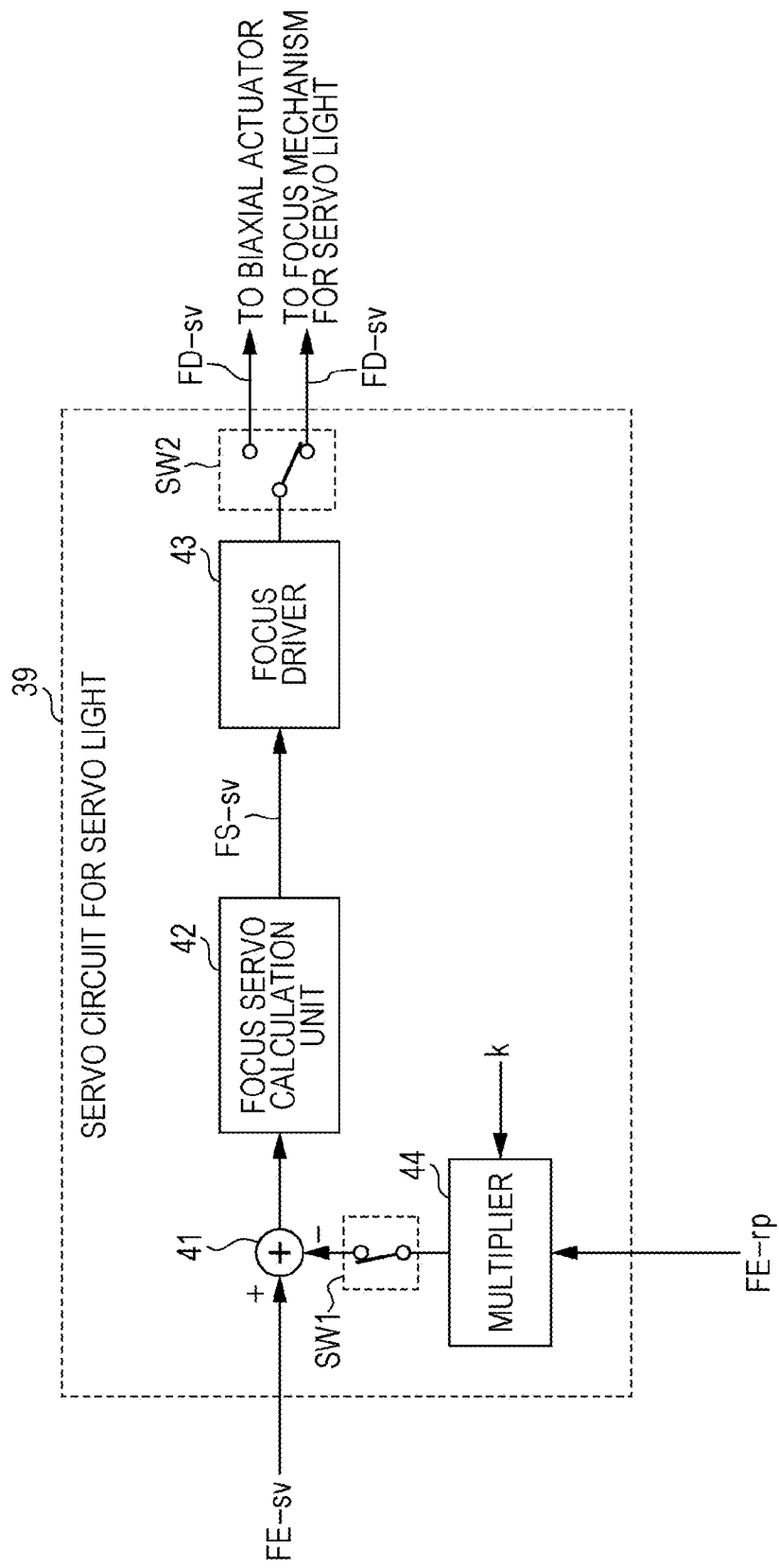
FIG. 9 is a diagram showing the internal configuration of a servo light side servo circuit (a servo circuit of a second servo system side) included in an optical drive device according to a first embodiment.

FIG. 9 shows the internal configuration of the servo circuit 39 for the servo light shown in FIG. 3.

In addition, in FIG. 9, only the configuration of the focus servo control system of the servo circuit 39 for the servo light is extracted and shown and the other configurations (for example, the configuration of the tracking servo control system and the like) are not shown.

As shown, in the servo circuit 43 for the servo light, a subtractor 41, a focus servo calculation unit 42, a focus driver 43, a multiplier 44, a switch SW1 and a switch SW2 are provided.

The focus error signal FE-sv from the matrix circuit 37 for the servo light shown in FIG. 3 is input to the subtractor 41.

The focus error signal FE-rp from the matrix circuit 34 for the recording/reproducing light shown in FIG. 3 is multiplied by the coefficient k by the multiplier 44 and then is input to the subtractor 41 through the switch SW1 which is an on/off switch.

The subtractor 41 subtracts the focus error signal FE-rp input through the switch SW1 from the focus error signal FE-sv and outputs the result to the focus servo calculation unit 42.

The focus servo calculation unit 42 performs a servo calculation (phase compensation, loop gain application or the like) with respect to the signal obtained by the subtraction result of the subtractor 41 and generates the focus servo signal FS-sv.

The focus driver 43 generates the focus drive signal FD-sv for driving the focus coil of the biaxial actuator 21 or the lens driving unit 29 shown in FIG. 3 based on the focus servo signal FE-sv.

The switch SW2 is a 3-terminal switch including one input terminal and two output terminals and, as shown, the focus drive signal FD-sv from the focus driver 43 is supplied to the input terminal. One of the two output terminals is connected to the biaxial actuator 21 (focus coil) and the other thereof is connected to the focus mechanism for the servo light (lens driving unit 29).

As described above, the controller 40 shown in FIG. 3 instructs the servo circuit 39 for the servo light to execute the focus servo control of the biaxial actuator 21 (objective lens 20) during recording and to execute the focus servo control of the lens driving unit 29 during reproduction. For confirmation, since the focus servo control of the servo laser beam side during recording is performed with respect to the objective lens 20, it is not necessary to perform the subtraction of the focus error signal FE in the above-described embodiment.

In the servo circuit 39 for the servo light, the switch SW1 is configured to be turned off according to the instruction during recording from the controller 40 and to be turned on according to the instruction during reproduction.

In addition, the switch SW2 is configured to perform contact switching so as to select the output terminal of the biaxial actuator 21 (focus coil) side according to the instruction during recording from the controller 40 and to perform contact switching so as to select the output terminal of the focus mechanism for the servo light (lens driving unit 29) side according to the instruction during reproduction.

Accordingly, it is possible to realize the servo control operation during recording/reproduction by the above-described servo circuit 39 for the servo light.

Figure 10:
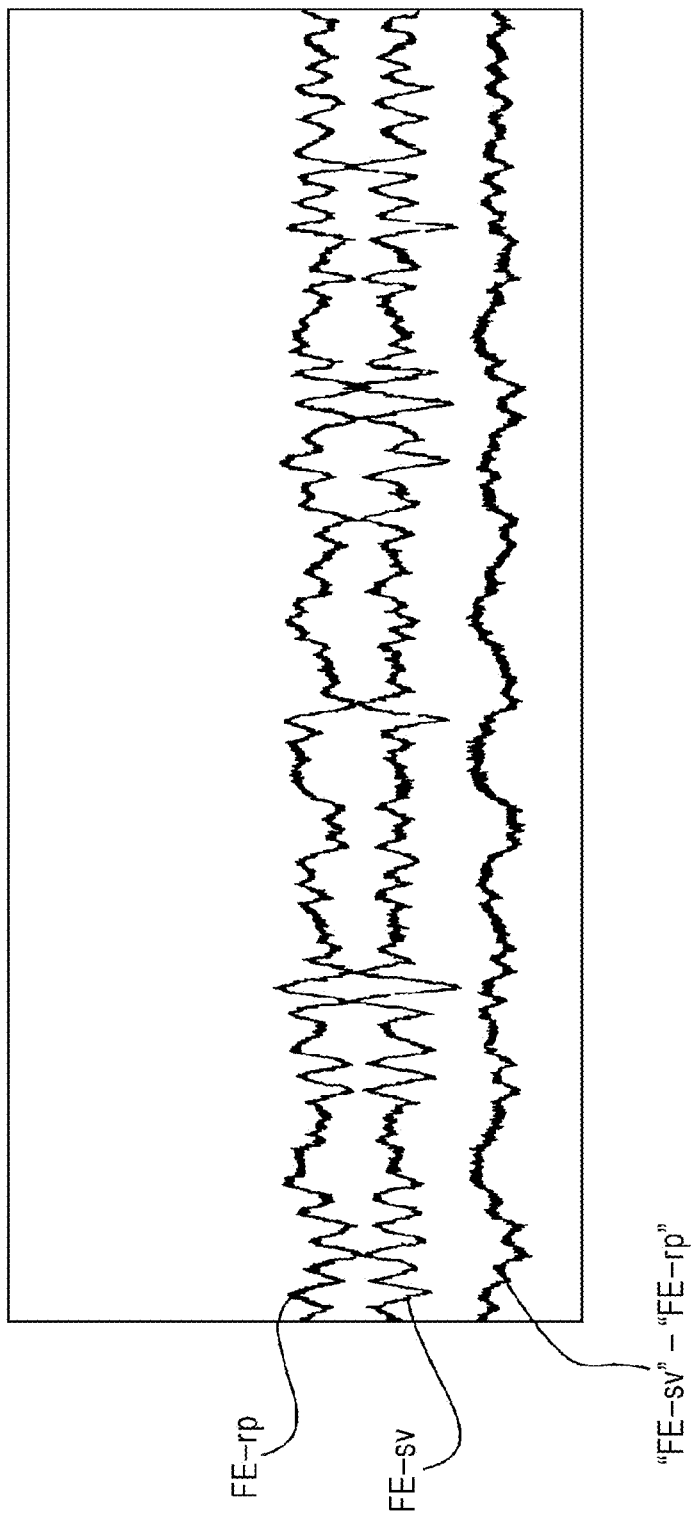
FIG. 10 is a diagram illustrating the effectiveness of a focus servo control method of an embodiment.

FIG. 10 is a diagram illustrating the effectiveness of the focus servo control method of the present embodiment, which shows the waveforms of the focus error signal FE-rp and the focus error signal FE-sv and the waveform of the signal obtained by the subtraction process "FE-sv"–"FE-rp".

In addition, in FIG. 10, for convenience, the polarity of the focus error signal FE-rp is reversed from the original polarity thereof.

In this drawing, the focus error signal FE-rp is not multiplied by the coefficient k.

As can be seen from FIG. 10, as in the present embodiment, if the subtraction process corresponding to "FE-sv"–"FE-rp" is performed, the component of the focus error signal FE-rp which is not originally followed from the focus error signal FE-sv is eliminated.

In other words, the error signal by "FE-sv"–"FE-rp" in the drawing represents the component of the gap error between the recording mark string and the reference surface Ref. Thus, according to the present embodiment in which the focus servo control is performed by the servo light side servo system according to the signal "FE-sv"–"FE-rp", the focus servo control of the servo light during reproduction is appropriately performed.

As described above, according to the present embodiment, if the configuration in which irradiating both the first light (in this case, the recording/reproducing laser beam) and the second light (in this case, the servo laser beam) are irradiated to the optical disc recording medium through the common objective lens, and, while the first focus mechanism (biaxial actuator 21) which is the focus mechanism of the objective lens is driven so as to perform the focus servo control of the first light, the second focus mechanism (in this case, the focus mechanism for the servo light) for changing the collimation of the second light incident to the objective lens is driven so as to perform the focus servo control of the second light is employed, it is possible to prevent the residual error component of the first focus servo system for performing the focus servo control of the first light by the driving of the first focus mechanism from overlapping the second focus servo system for performing the focus servo control of the second light by the driving of the second focus mechanism.

As a result, it is possible to stably perform the focus servo control of the second light with high precision.

As described above, if it is possible to exclude the influence of the residual error of the first focus servo system on the second focus servo system, it is possible to independently design the first and second focus servo systems. Therefore, according to the present embodiment, it is possible to increase the degree of freedom in the design of the servo system.

2. Second Embodiment 2-1. Configuration of Optical Drive Device

Subsequently, a second embodiment will be described.

Figure 11:
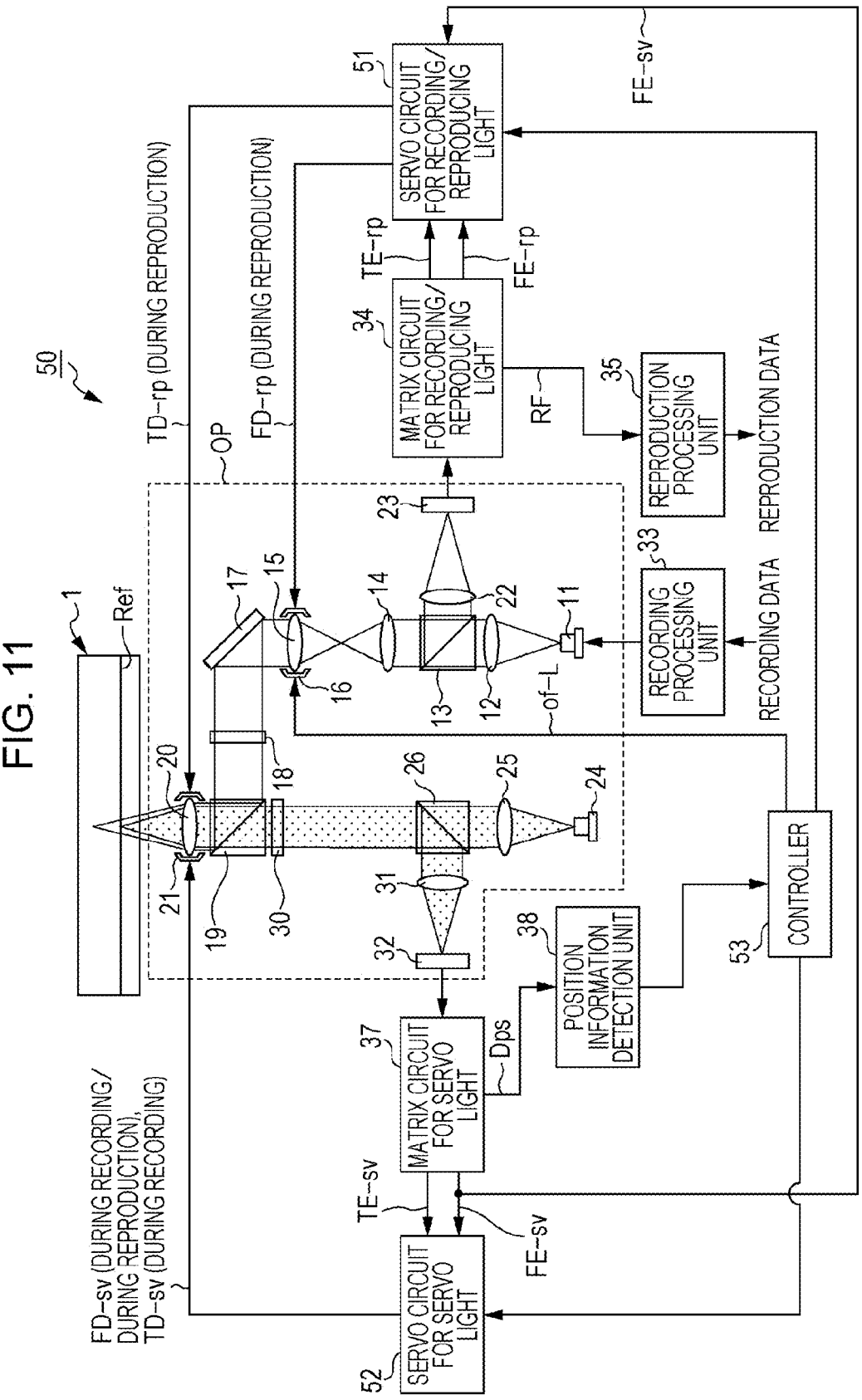
FIG. 11 is a diagram showing the internal configuration of an optical drive device of a second embodiment.

FIG. 11 is a diagram showing the internal configuration of an optical drive device (referred to as a recording/reproducing device 50) according to a second embodiment.

In FIG. 11, the same parts described in FIG. 3 are denoted by the same reference numerals and the description will be omitted.

The second embodiment is opposed to the first embodiment in the relationship between the first focus servo system and the second focus servo system. In detail, in the second embodiment, in regard to the focus servo control of the recording/reproducing laser beam and the servo laser beam during reproduction, the focus servo control of the servo laser beam is performed by driving the biaxial actuator 21 (first focus mechanism) of the objective lens 20 and the focus servo control of the recording/reproducing laser beam is performed by driving the focus mechanism for the recording/reproducing light (lens driving unit 16: second focus mechanism). That is, in the relationship between the focus servo systems formed during reproduction in the second embodiment, the first focus servo system becomes the servo laser beam side servo system and the second focus servo system becomes the recording/reproducing laser beam side servo system.

As can be seen from the comparison with FIG. 3, in the recording/reproducing device 50 of the second embodiment, the focus mechanism for the servo light (the fixed lens 27, the movable lens 28 and the lens driving unit 29) included in the recording/reproducing device 10 is omitted.

In addition, in the recording/reproducing device 50, a servo circuit 51 for the recording/reproducing light servo circuit is provided instead of the servo circuit 36 for the recording/reproducing light shown in FIG. 3, and a servo circuit 52 for the servo light is provided instead of the servo circuit 39 for the servo light.

In addition, a controller 53 is provided instead of the controller 40.

In this case, the controller 53 instructs the servo circuit 52 for the servo light to execute the focus servo control and the tracking servo control of the objective lens 20 during recording. In this case, the controller 53 drives the lens driving unit 16 according to the value of the offset "of-L" set in correspondence with the information recording layer L to be recorded and sets the focusing position of the recording/reproducing laser beam, during recording.

The controller 53 instructs the servo circuit 52 for the servo light to execute only the focus servo control of the objective lens 20, and instructs the servo circuit 51 for the recording/reproducing light to execute the tracking servo control of the objective lens 20 and the focus servo control of the lens driving unit 16.

In this case, since the subtractor 41 and the multiplier 44 shown in FIG. 9 are omitted, the servo circuit 52 for the servo light is configured to switch between a state (during recording) of outputting the tracking drive signal TD-sv to the tracking coil of the biaxial actuator 21 and outputting the focus drive signal FE-sv to the focus coil and the state of outputting the focus drive signal FD-sv to the focus coil.

Figure 12:
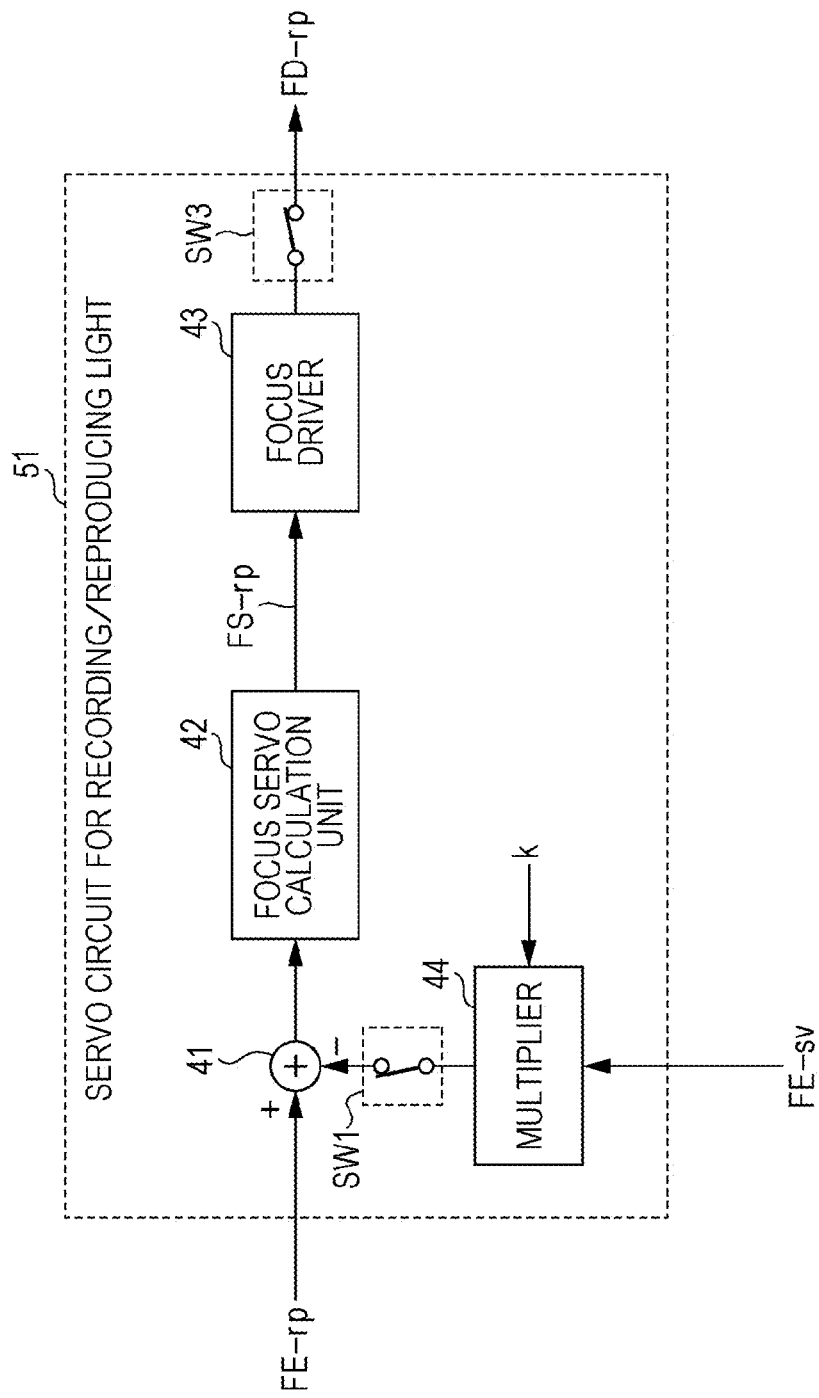
FIG. 12 is a diagram showing the internal configuration of a recording/reproducing light side servo circuit (a servo circuit of a second servo system side) included in an optical drive device of a second embodiment.

FIG. 12 shows the internal configuration of the servo circuit 51 for the recording/reproducing light shown in FIG. 11.

The servo circuit 51 for the recording/reproducing light is different from the servo circuit 39 for the servo light shown in FIG. 9 in that the signal input to the subtractor 41 becomes the focus error signal FE-rp, the output from the focus servo calculation unit 42 becomes the focus servo signal FS-rp, and the output from the focus driver 43 becomes FD-rp. In addition, it is different in that the input to the multiplier 44 is not the focus error signal FE-rp and is the focus error signal FE-sv branched and supplied from the matrix circuit 37 for the servo light.

In this case, a switch SW3 which is an on/off switch is provided instead of the 3-terminal switch SW2 shown in FIG. 9.

The switch SW1 is turned off according to the instruction during recording from the controller 53 and turned on according to the instruction during reproduction, similar to the first embodiment.

In addition, the switch SW3 is turned off according to the instruction during recording from the controller 53 and is turned on according to the instruction during reproduction.

By the configuration of the servo circuit 51 for the recording/reproducing light shown in FIG. 12, in this case, in the recording/reproducing light side servo system which is the second focus servo system, the component corresponding to the focus error signal FE-sv of the servo light side servo system which is the first focus servo system is subtracted from the focus error signal FE-rp of the recording/reproducing light side servo system, and the recording/reproducing light side servo system performs the focus servo control of the second focus mechanism (lens driving unit 16) by the signal obtained by the subtraction.

That is, in this case, it is possible to efficiently prevent the leakage of the residual error component from the servo light side servo system occurring in the recording/reproducing light side servo system during reproduction and, as a result, to efficiently solve the performance deterioration and stability deterioration of the recording/reproducing light side servo system.

3. Third Embodiment 3-1. Optical Disc Recording Medium to be Recorded/Reproduced in Third Embodiment A third embodiment is different from the first and second embodiments in the optical disc recording medium used as a target.

Figure 13:
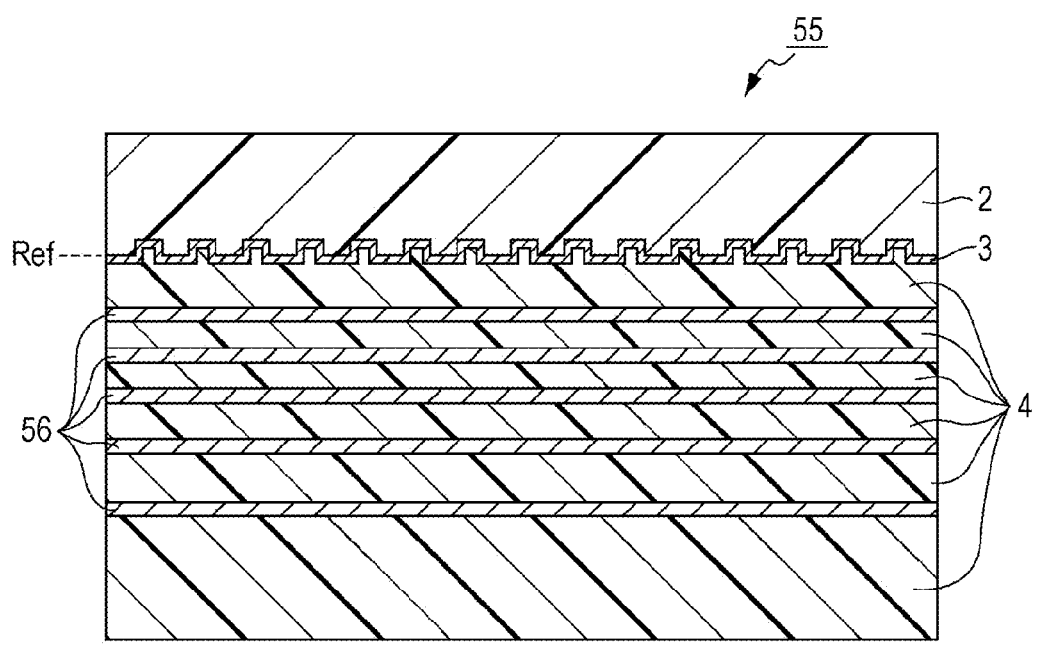
FIG. 13 is a cross-sectional structural diagram of an optical disc recording medium to be recorded/reproduced according to a third embodiment.

FIG. 13 is a cross-sectional structural diagram of the optical disc recording medium to be recorded/reproduced in the third embodiment.

As shown in FIG. 13, the optical disc recording medium to be recorded/reproduced in the third embodiment is equal to the bulk type recording medium 1 shown in FIG. 1 in that the cover layer 2, the selective reflection film 3 and the intermediate layer 4 are sequentially formed from the upper layer side. However, in this case, a recording layer having a layer structure shown in the drawing is laminated instead of the bulk layer 5.

In detail, the recording layer having a multi-layer structure obtained by repeatedly laminating the translucent recording film 56, the intermediate layer 4, the translucent recording film 56, the intermediate layer 4, . . . is laminated on the lower layer side of the intermediate layer 4.

The optical disc recording medium of the third embodiment is hereinafter referred to as a multi-layer recording medium 55 because the recording layer having the multi-layer structure is formed.

Here, it is noted that guide grooves accompanying the formation of grooves, pit rows or the like is not formed in the translucent recording film 56.

That is, in the multi-layer recording medium 55, the guide grooves are formed only at one layer position as the reference surface Ref.

In such a multi-layer recording medium 55, since the translucent recording film 56 is formed, it is possible to obtain the reflected light of the recording/reproducing laser beam even during recording.

Accordingly, during recording, the focus servo control of the recording/reproducing laser beam is performed by driving the objective lens 20 based on the reflected light of the recording/reproducing laser beam so as to focus on the translucent recording film 56 to be recorded.

The tracking servo control of the recording/reproducing laser beam during recording is performed using the servo laser beam, even in this case. That is, even in this case, the tracking servo control during recording is performed by driving the objective lens 20 based on the reflected light from the reference surface Ref of the servo laser beam such that the focusing position of the servo laser beam follows the guide grooves of the reference surface Ref.

During reproduction, even in this case, it is possible to perform the tracking servo control of the recording/reproducing laser beam based on the already recorded mark string. As can be understood from the above description, even during reproduction, it is possible to perform the focus servo control of the recording/reproducing laser beam using the reflected light from the translucent recording film 56 (information recording layer L) as a target.

That is, in this case, the servo control during reproduction is performed by the same method as the first embodiment. That is, the focus servo control of the recording/reproducing laser beam during reproduction is performed by driving the objective lens 20 based on the reflected light of the recording/reproducing laser beam such that the recording/reproducing servo light focuses on the information recording layer L as a target, and the tracking servo control of the recording/reproducing laser beam is performed by driving the objective lens 20 based on the reflected light of the recording/reproducing laser beam such that the focusing position of the recording/reproducing light servo light follows the recorded mark string.

As described above, in the third embodiment, since the focus servo of the recording/reproducing laser beam based on the reflected light from the translucent recording film 56 is performed during recording, the gap error between the reference surface Ref and the recorded mark string shown in FIG. 22 generated when the bulk type recording medium 1 is used as a target is not generated.

However, in practice, in the process of laminating the translucent recording film 56, it is difficult to prevent film unevenness. To this end, it is difficult to make the gap between the translucent recording film 56 and the reference surface Ref uniform in the circumference of the disc.

That is, as shown in FIG. 13, the multi-layer structure of the recording medium 55 in which the gap between the reference surface Ref and the translucent recording film 56 is uniform (that is, the reference surface Ref and the translucent recording film 56 are parallel to each other) is only ideal and, in practice, a gap error generated between the reference surface Ref and the mark string shown in FIG. 22 is generated between the reference surface Ref and the translucent recording film 56.

In practice, from the non-parallel relationship between the reference surface Ref and the translucent recording film 56, even in the third embodiment using the multi-layer recording medium 55 as a target, it is necessary to concurrently perform the focus servo control for absorbing the gap error using the second focus mechanism.

In particular, in the third embodiment, since the focus servo control of the objective lens 20 (first focus mechanism) is performed based on the recording/reproducing laser beam even during recording, the focus servo control for absorbing the gap error between the reference surface Ref and the information recording layer L (translucent recording film 56) using the second focus mechanism is performed during recording as well as during reproduction.

In detail, during recording, as described above, the focus servo control performed by driving the objective lens 20 based on the reflected light of the recording/reproducing laser beam and the tracking servo control performed by driving the objective lens 20 based on the reflected light of the servo laser beam are performed, and the second focus mechanism (corresponding to the lens driving unit 29 of FIG. 3) is driven based on the reflected light of servo laser beam so as to perform the focus servo control such that the servo laser beam focuses on the reference surface Ref.

During reproduction, as described above, the focus servo control and the tracking servo control of the objective lens 20 based on the reflected light of the recording/reproducing laser beam are executed, and, similar to during recording, the second focus mechanism (lens driving unit 29) is driven based on the reflected light of the servo laser beam so as to perform the focus servo control such that the servo laser beam focuses on the reference surface Ref.

In this way, in the third embodiment in which recording/reproducing is performed with respect to the multi-layer recording medium 55, double servo using the first focus servo system and the second focus servo system is performed both during recording and during reproduction.

Accordingly, in the third embodiment, the servo performance deterioration of the second focus servo system due to the leakage of the residual error component of the first focus servo system side occurs both during recording and during reproduction.

3-2. Configuration of Optical Drive Device

Figure 14:
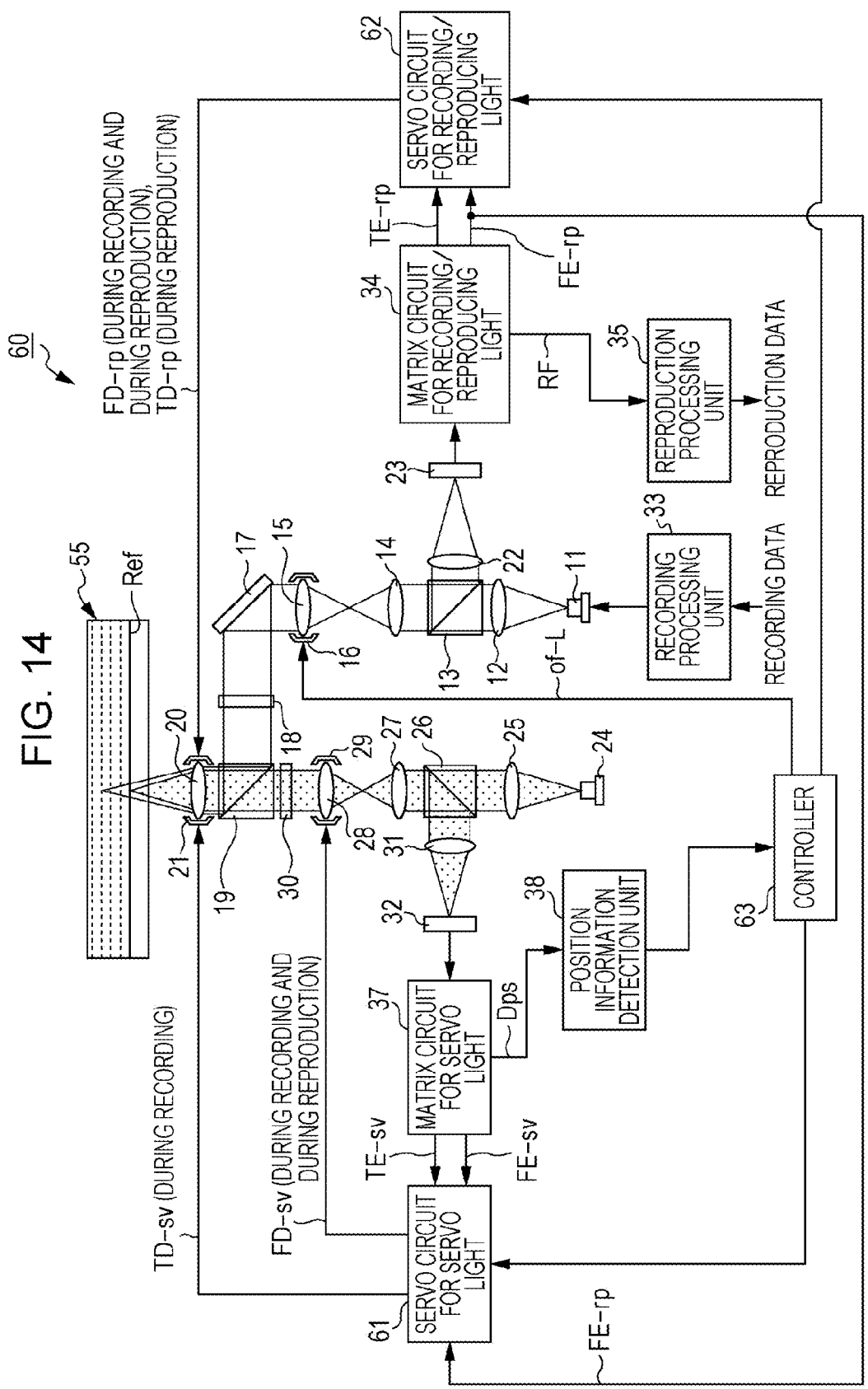
FIG. 14 is a diagram showing the internal configuration of an optical drive device of a third embodiment.
Figure 15:
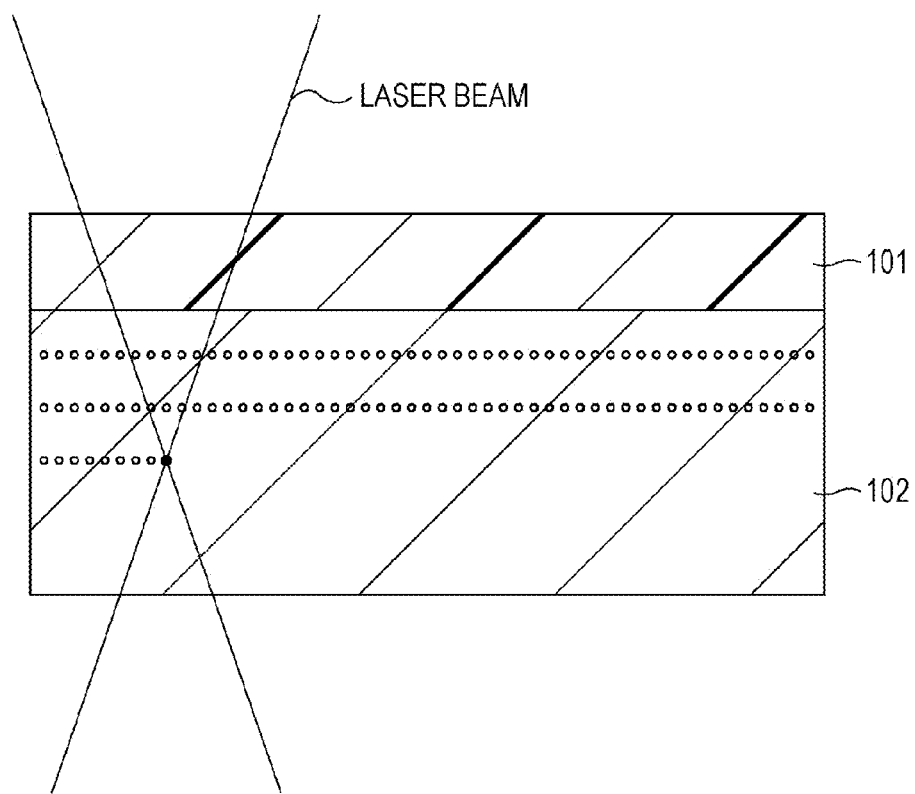
FIG. 15 is a diagram illustrating a bulk recording method.
Figure 16A:
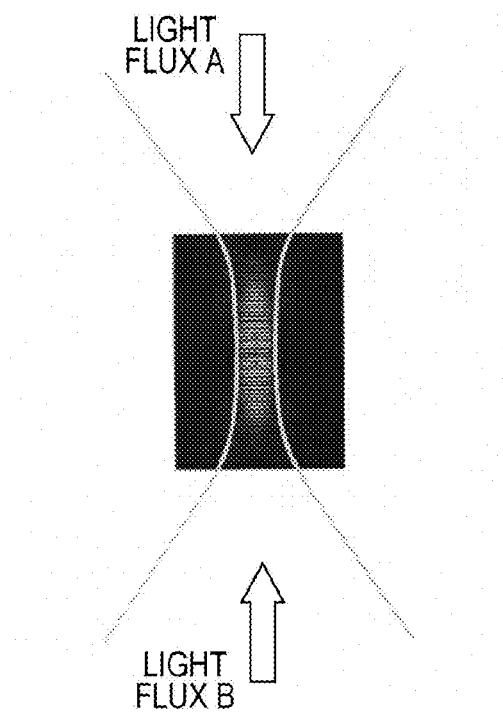
FIGS. 16A and 16B are diagrams illustrating a micro hologram method.
Figure 16B:
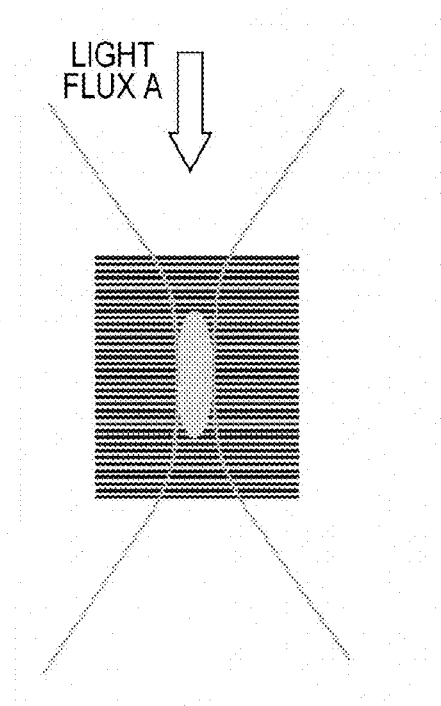
Figure 17A:
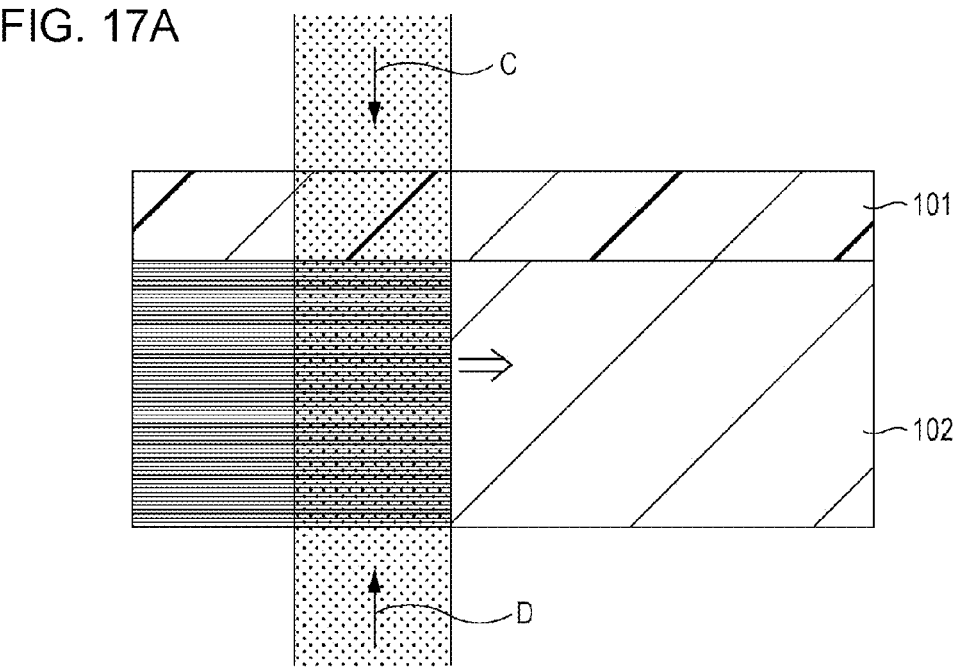
FIGS. 17A and 17B are diagrams illustrating a negative type micro hologram method.
Figure 17B:
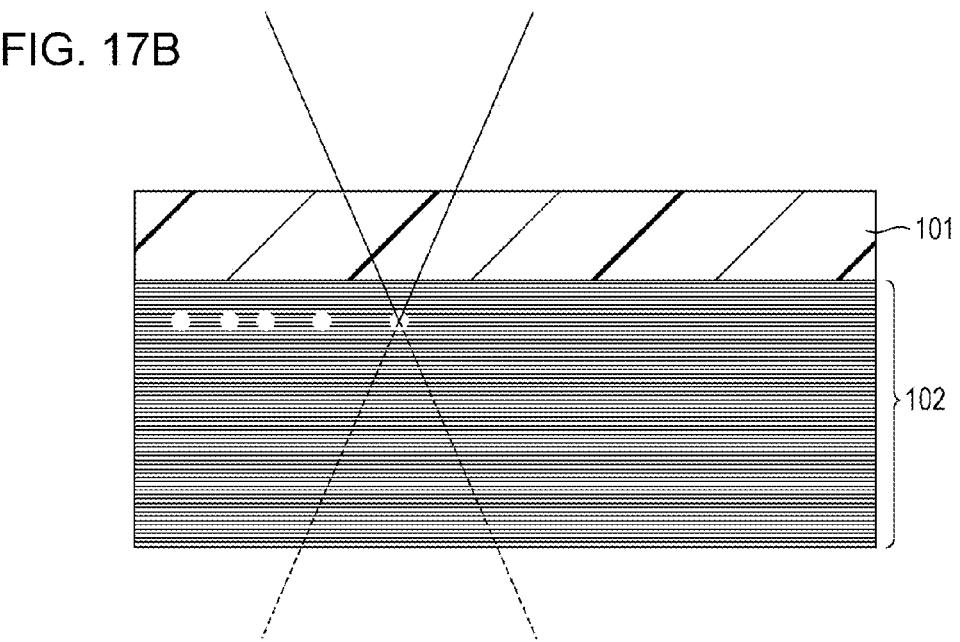
Figure 18:
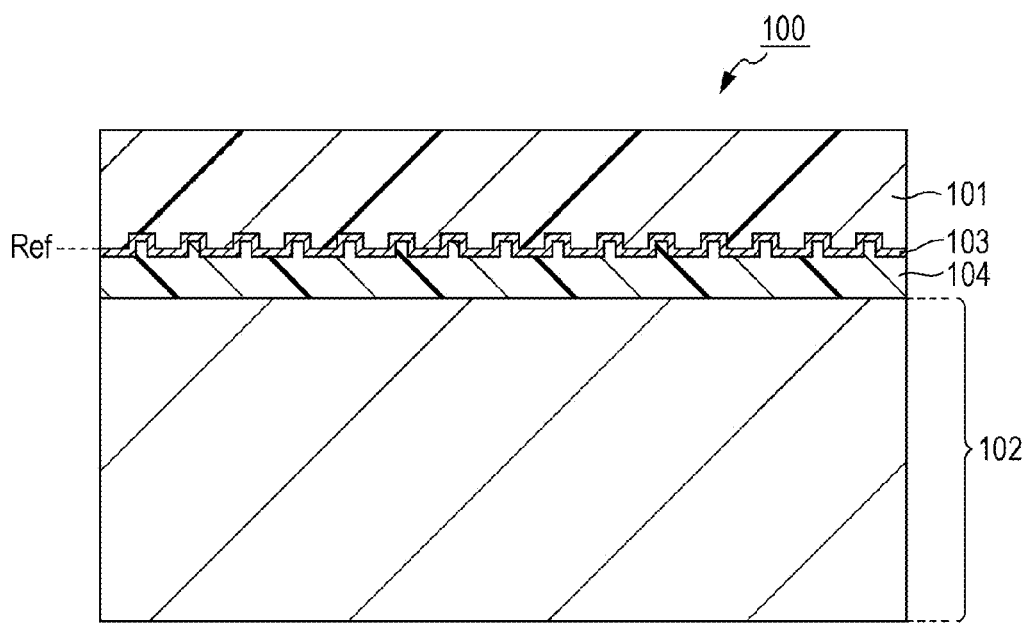
FIG. 18 is a diagram showing an example of the cross-sectional structure of an actual bulk type recording medium having a reference surface.
Figure 19:
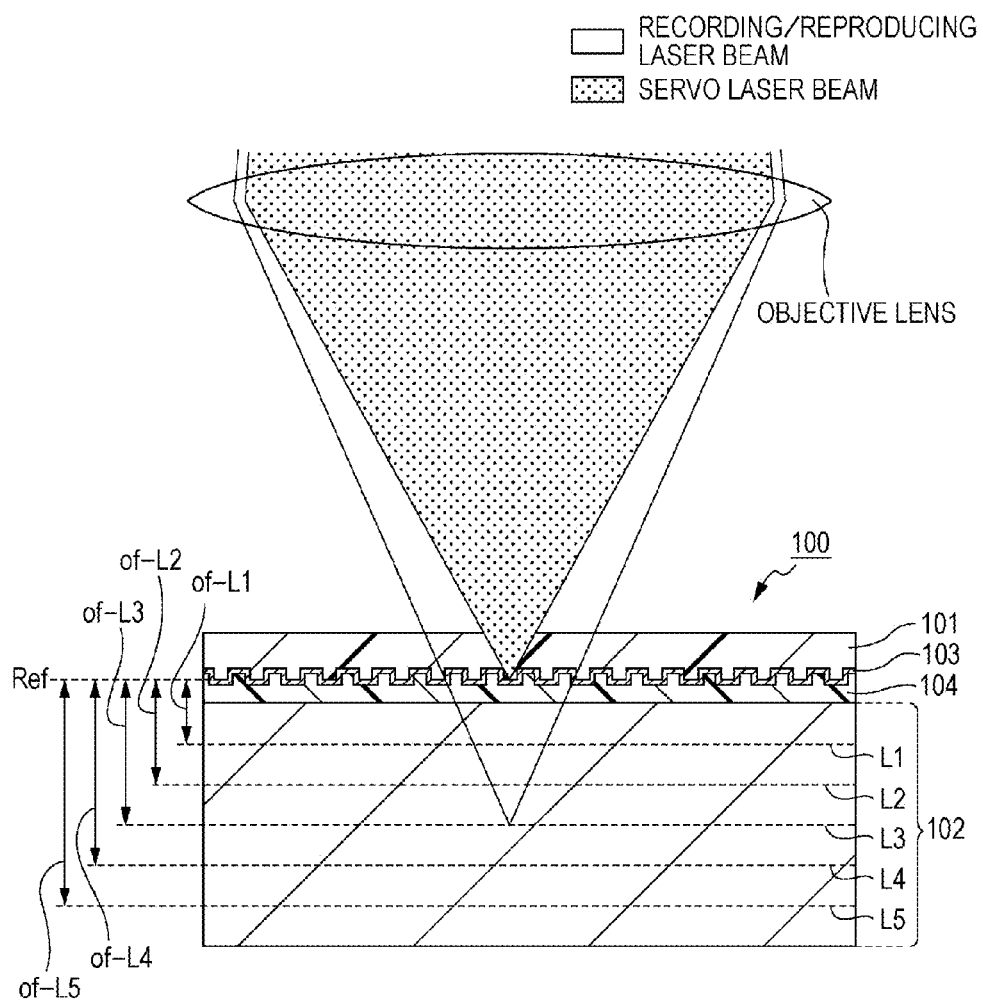
FIG. 19 is a diagram illustrating an operation during mark recording of a bulk type recording medium.
Figure 20:
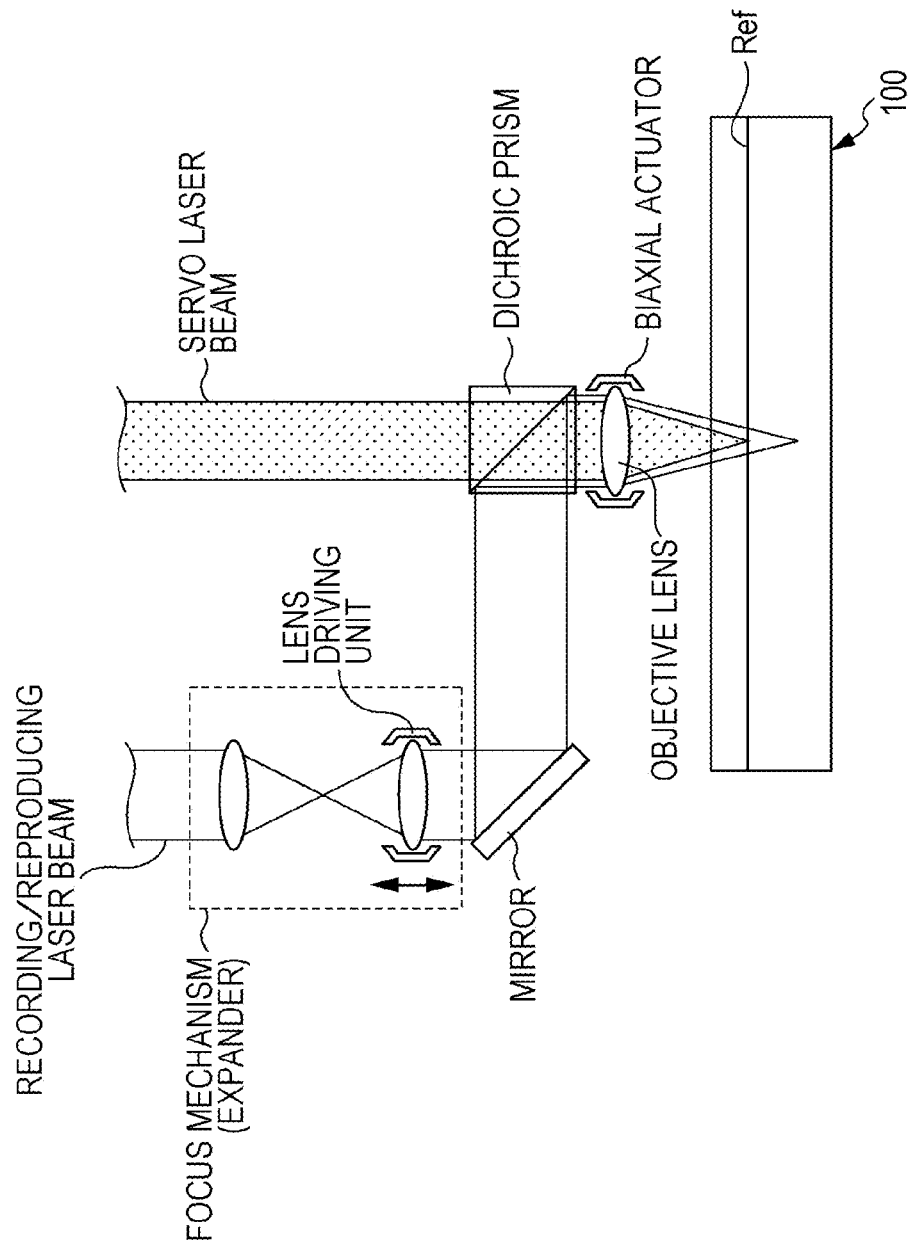
FIG. 20 is a diagram showing a configuration example of an optical system for performing recording/reproduction of a bulk type recording medium.
Figure 21:
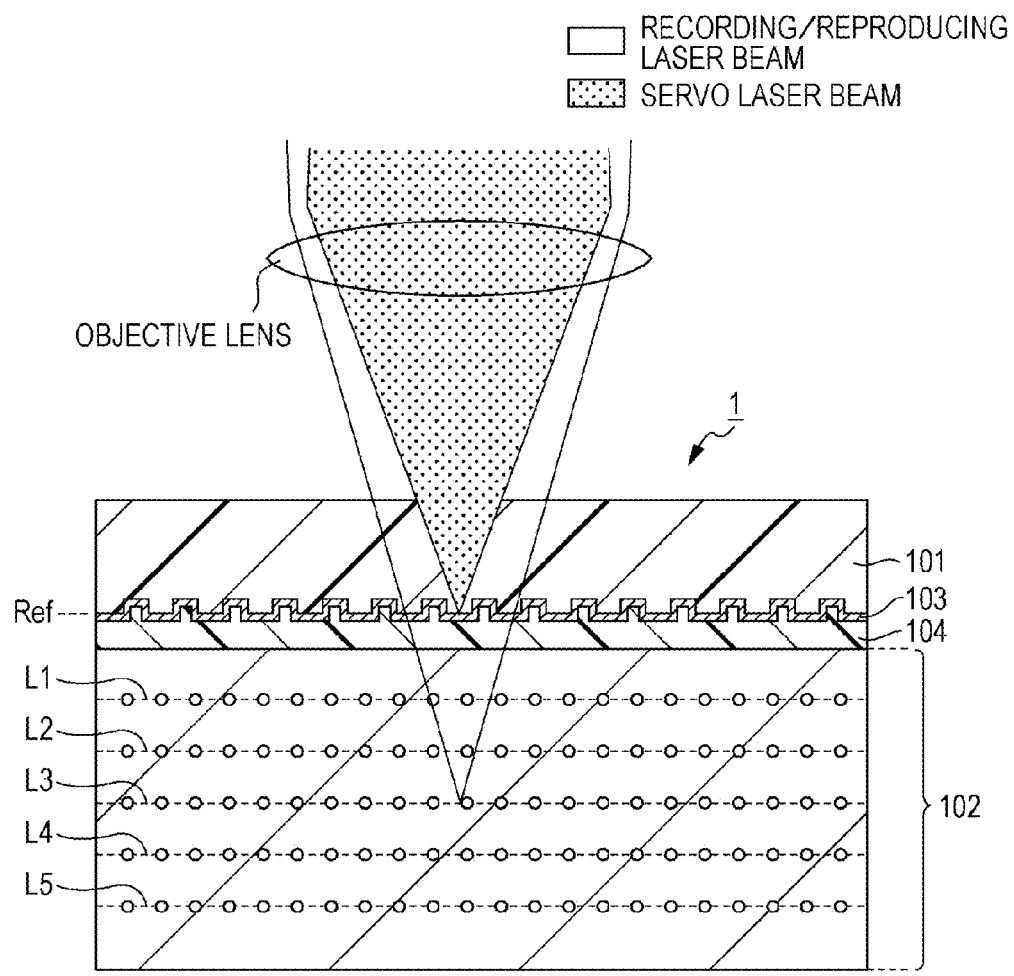
FIG. 21 is a diagram illustrating servo control during reproduction of a bulk type recording medium.

The third embodiment is to prevent the leakage of the residual error of the first focus servo system occurring both during recording and during reproduction, and the configuration of the optical drive device therefor is shown in FIG. 14.

FIG. 14 is a diagram showing the internal device of the optical drive device (referred to as a recording/reproducing device 60) according to the third embodiment.

In FIG. 14, the parts described up to now are denoted by the same reference numerals and the description thereof will be omitted.

The recording/reproducing device 60 of the third embodiment is different from the recording/reproducing device 10 shown in FIG. 3 in that a servo circuit 62 for the recording/reproducing light is provided instead of the servo circuit 36 for the recording/reproducing light and a servo circuit 61 for the servo light is provided instead of the servo circuit 39 for the servo light.

In addition, it is different in that a controller 63 is provided instead of the controller 40.

In this case, the controller 63 instructs the servo circuit 62 for the recording/reproducing light to execute the focus servo control of the objective lens 20 both during recording and during reproduction and, similarly, instruct the servo circuit 61 for the servo light to execute the focus servo control of the lens driving unit 19 during recording and during reproduction.

In addition, during recording, the servo circuit 61 for the servo light is instructed to execute the tracking servo control of the objective lens 20.

During reproduction, the servo circuit 62 for the recording/reproducing light is instructed to execute the tracking servo control of the objective lens 20.

In this case, although the controller 63 drives the lens driving unit 16 according to the value of the offset "of-L" set in correspondence with the information recording layer L (translucent recording film 56) as a target during recording and during reproduction, the offset is not important and is not necessary if the working distance of the objective lens 20 is enough.

Although not shown, in the internal configuration of the servo circuit 61 for the servo light, with respect to the configuration of the focus servo control system, the switch SW1 and the switch SW2 may be omitted from the configuration shown in FIG. 9 and the output (focus drive signal FD-sv) of the focus driver 43 may be supplied to the lens driving unit 29.

With respect to the configuration of the tracking servo control system, according to the instruction from the controller 63, the output of the tracking drive signal TD-sv to the tracking coil of the biaxial actuator 21 may be selectively turned on/off.

With respect to the servo circuit 62 for the recording/reproducing light, as the configuration of the focus servo control system, the focus drive signal FD-rp may be output to the focus coil of the biaxial actuator 21 and, with respect to the tracking servo control system, the output of the tracking drive signal TD-rp to the tracking coil of the biaxial actuator 21 may be selectively turned on/off according to the instruction from the controller 63.

By the configuration of the above-described recording/reproducing device 60, in this case, it is possible to efficiently prevent the leakage of the residual error component at the first focus servo system (in this case, the recording/reproducing light side servo system) side occurring both during recording and during reproduction.

In addition, although in the above description, the first focus servo system is the recording/reproducing light side servo system and the second focus servo system is the servo light side servo system similar to the first embodiment as the example of the servo control of the case of performing recording/reproduction in correspondence with the multi-layer recording medium 55, the first focus servo system may be the servo light side servo system and the second focus servo system may be the recording/reproducing light side servo system similar to the second embodiment.

In detail, in this case, the focus mechanism for the servo light (the fixed lens 27, the movable lens 28 and the lens driving unit 29) shown in FIG. 14 may be omitted. Both during recording and during reproduction, the focus servo control of the objective lens 20 is performed such that the servo laser beam focuses on the reference surface Ref based on the reflected light of the servo laser beam and, similarly, both during recording and during reproduction, the focus servo control of the focus mechanism for the recording/reproducing light (lens driving unit 16) is performed such that the recording/reproducing laser beam focuses on the information recording layer L (translucent recording film 56) as a target based on the reflected light of the recording/reproducing laser beam.

In this case, the tracking servo control is performed by driving the objective lens 20 such that the focusing position of the servo laser beam follows the guide grooves formed in the reference surface Ref based on the reflected light of the servo laser beam during recording, and is performed by driving the objective lens 20 such that the focusing position of the recording/reproducing laser beam follows the recorded mark string based on the reflected light of the recording/reproducing laser beam during reproduction.

4. Modified Example

Although the embodiments of the present application are described, the present application is not limited to the above-described examples.

For example, although, in the above description, a method of providing the dichroic prism 19 so as to perform spectroscopy using a difference between the wavelengths of the lights when the reflected lights of the recording/reproducing laser beam and the servo laser beam are independently received by the device side is described, it is possible to perform spectroscopy using another method, for example, by employing a configuration for performing spectroscopy using a difference in polarization direction of p-polarized light/s-polarized light.

Although, in the above description, the case where the position guide element of the optical disc recording medium is formed by applying an uneven cross-sectional pattern such as grooves or pit rows is described, the position guide element of the optical disc recording medium of the present application may be formed, for example, by another method such as recording of a mark string.

Although, in the above description, the case where the reference surface Ref in which the position guide element is formed on the upper layer side of the recording layer is described, the present application is suitably applicable to the case where the reference surface Ref is formed on a lower layer side of the recording layer.

Although, in the above description, the present application is applied to the recording/reproducing device for performing both recording and reproduction with respect to the optical disc recording medium, the present application is suitably applicable to a reproduction-dedicated device (reproduction device) for performing only reproduction with respect to the optical disc recording medium.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An optical drive device comprising:
    a first light source;
    a second light source;
    an objective lens configured to receive a first light emitted from the first light source and a second light emitted from the second light source and to irradiate both the first light and the second light to an optical disc recording medium;
    a first focus mechanism configured to drive the objective lens in a focus direction;
    a second focus mechanism configured to change collimation of the second light incident to the objective lens and changing the focusing position of the second light independently of the first light;
    a first focus servo control unit configured to drive the first focus mechanism based on a first focus error signal obtained by receiving the reflected light of the first light so as to perform focus servo control of the first light;
    an error signal subtraction unit configured to subtract the first focus error signal from a second focus error signal obtained by receiving the reflected light of the second light; and
    a second focus servo control unit configured to drive the second focus mechanism based on the second focus error signal subjected to the subtraction by the error signal subtraction unit so as to perform focus servo control of the second light.

2. The optical drive device according to claim 1, wherein:
    the optical disc recording medium includes a reference surface having a reflection film, in which a position guide element is formed, and a multi-layer recording layer in which a plurality of translucent recording films is formed,
    the first light includes a recording/reproducing light for performing mark recording and/or reproduction with respect to the recording layer as a target, and
    the second light includes a servo light for performing servo control based on the position guide element formed in the reference surface.

3. The optical drive device according to claim 2, wherein:
the first focus servo control unit drives the first focus mechanism based on the first focus error signal obtained by receiving the reflected light of the recording/reproducing light so as to perform the focus servo control such that the recording/reproducing light focuses on a necessary translucent recording film,
the error signal subtraction unit subtracts the first focus error signal from the second focus error signal obtained by receiving the reflected light of the servo light, and
the second focus servo control unit drives the second focus mechanism based on the second focus error signal subjected to the subtraction by the error signal subtraction unit so as to perform the focus servo control such that the servo light focuses on the reference surface.

4. The optical drive device according to claim 1, wherein:
the optical disc recording medium includes a reference surface having a reflection film, in which a position guide element is formed, and a multi-layer recording layer in which a plurality of translucent recording film is formed,
the first light includes a servo light for performing servo control based on the position guide element formed in the reference surface, and
the second light includes a recording/reproducing light for performing mark recording and/or reproduction to the recording layer as a target.

5. The optical drive device according to claim 4, wherein:
the first focus servo control unit drives the first focus mechanism based on the first focus error signal obtained by receiving the reflected light of the servo light so as to perform the focus servo control such that the servo light focuses on the reference surface,
the error signal subtraction unit subtracts the first focus error signal from the second focus error signal obtained by receiving the reflected light of the recording/reproducing light, and
the second focus servo control unit drives the second focus mechanism based on the second focus error signal subjected to the subtraction by the error signal subtraction unit so as to perform the focus servo control such that the recording/reproducing light focuses on a necessary translucent recording film.

6. The optical drive device according to claim 1, wherein the first light source and the second light source emit lights having different wavelengths.

7. A focus servo control method of an optical drive device including a first light source, a second light source, an objective lens configured to receive a first light emitted from the first light source and a second light emitted from the second light source and to irradiate both the first light and the second light to an optical disc recording medium, a first focus mechanism configured to drive the objective lens in a focus direction, and a second focus mechanism configured to change collimation of the second light incident to the objective lens and changing the focusing position of the second light independently of the first light, the method comprising the steps of:

driving the first focus mechanism based on a first focus error signal obtained by receiving the reflected light of the first light so as to perform focus servo control of the first light;

subtracting the first focus error signal from a second focus error signal obtained by receiving the reflected light of the second light; and driving the second focus mechanism based on the second focus error signal subjected to the subtraction by the step of subtracting the error signal so as to perform focus servo control of the second light.

* * * * *